United States Patent [19]

Osborn

[11] Patent Number: 4,490,622
[45] Date of Patent: Dec. 25, 1984

[54] TURBOCHARGER AND ADAPTATIONS THEREOF

[76] Inventor: Norbert L. Osborn, 402 W. Grauwyler, Irving, Tex. 75061

[21] Appl. No.: 441,726

[22] Filed: Nov. 15, 1982

Related U.S. Application Data

[60] Division of Ser. No. 38,286, May 11, 1979, abandoned, and a continuation-in-part of Ser. No. 759,773, Jan. 14, 1977, Pat. No. 4,179,247.

[51] Int. Cl.³ .................................... F02B 37/00
[52] U.S. Cl. .................................. 290/52; 290/2; 417/406
[58] Field of Search ............... 60/39.31, 39.32, 39.43; 184/6.11, 6.26; 285/48, 330; 308/189 A, 189 R; 415/98, 110–112, 115–117, 159–165, 170 R, 177, 180, 201, 217, DIG. 1; 416/95, 97 R, 184, 244 A; 417/405, 406, 407, 408, 409, 410; 290/52

[56] References Cited

U.S. PATENT DOCUMENTS

| | | | |
|---|---|---|---|
| 2,508,397 | 5/1950 | Kane | 290/2 |
| 2,991,926 | 7/1961 | Diefenderfer | 417/406 |
| 3,247,393 | 4/1966 | Toesca | 290/52 |
| 3,961,199 | 6/1976 | Bronicki | 290/52 |

*Primary Examiner*—J. V. Truhe
*Assistant Examiner*—Terry Flower
*Attorney, Agent, or Firm*—Richards, Harris & Medlock

[57] ABSTRACT

The invention provides a turbocharger (20), compressor (170) and turbine (172) rotors mounted on a shaft (160) supported by ball bearing assemblies (162, 164) such that the compressor rotor (172) and turbine rotor (170) are overhung to one side of the bearing assemblies with the turbine rotor separated from the bearing assemblies by the compressor rotor. The turbocharger (20) includes a turbine nozzle area (230) having a plurality of nozzle vanes (234) spaced circumferentially about the turbine rotor and in the nozzle area through which exhaust air from the engine is received into the turbine. A control linkage (228) is positioned intermediate of the compressor rotor and turbine rotor and controls the position of the nozzle vanes to vary the flow of exhaust gases to the tubine rotor. A concentrically positioned cylindrical module (60) is supported within the compressor inlet by struts (62) extending from the inlet wall (64) to the module (60) thereby dividing the inlet into more than one inlet passage. In one embodiment of the invention, a second compressor rotor (450) is mounted on the shaft (160) in the compressor inlet upstream of the first compressor rotor (172). In other embodiments of the invention, the turbocharger (20) is modified to function as a turbojet (500, 750) and as a turbofan (650).

1 Claim, 31 Drawing Figures

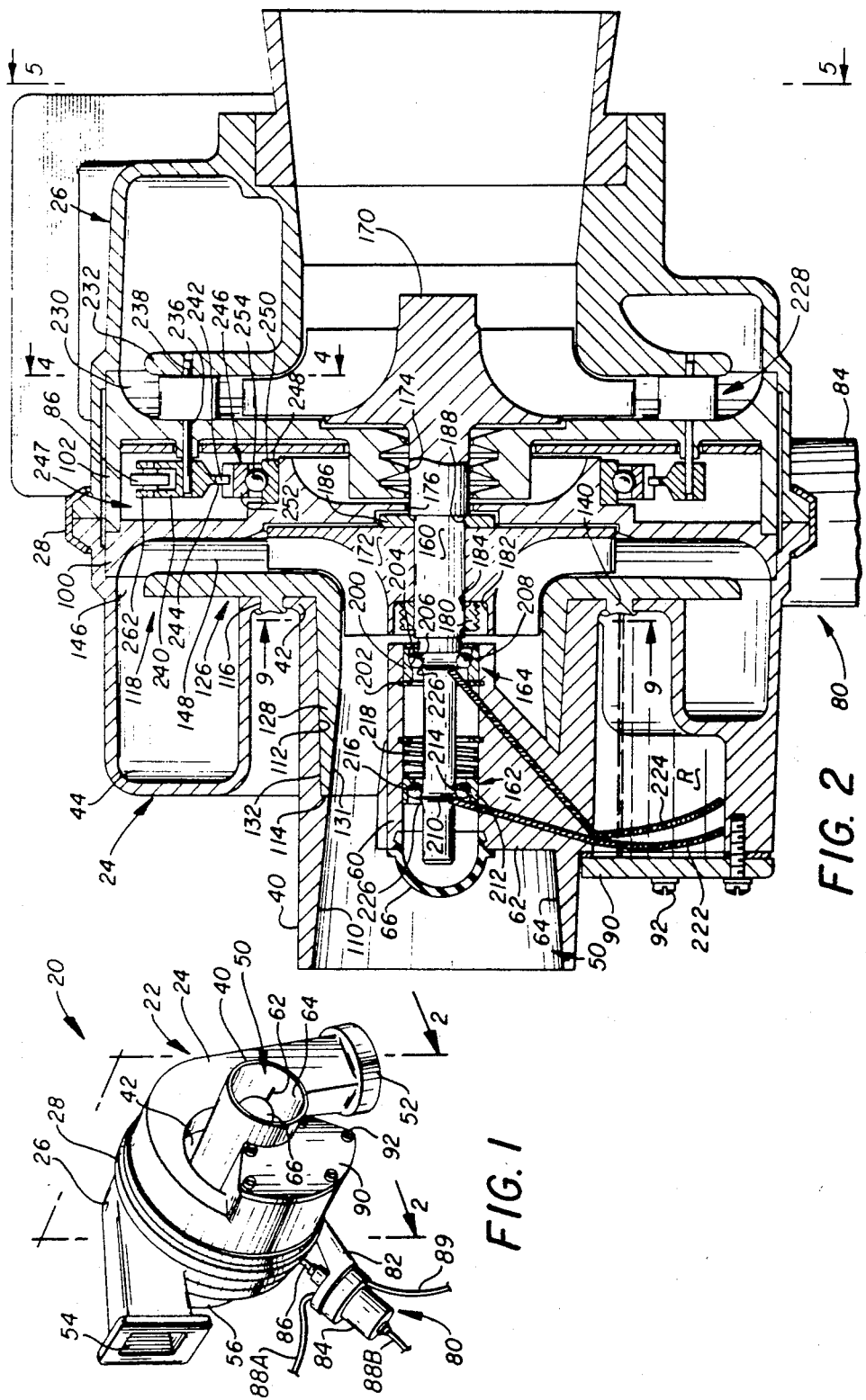

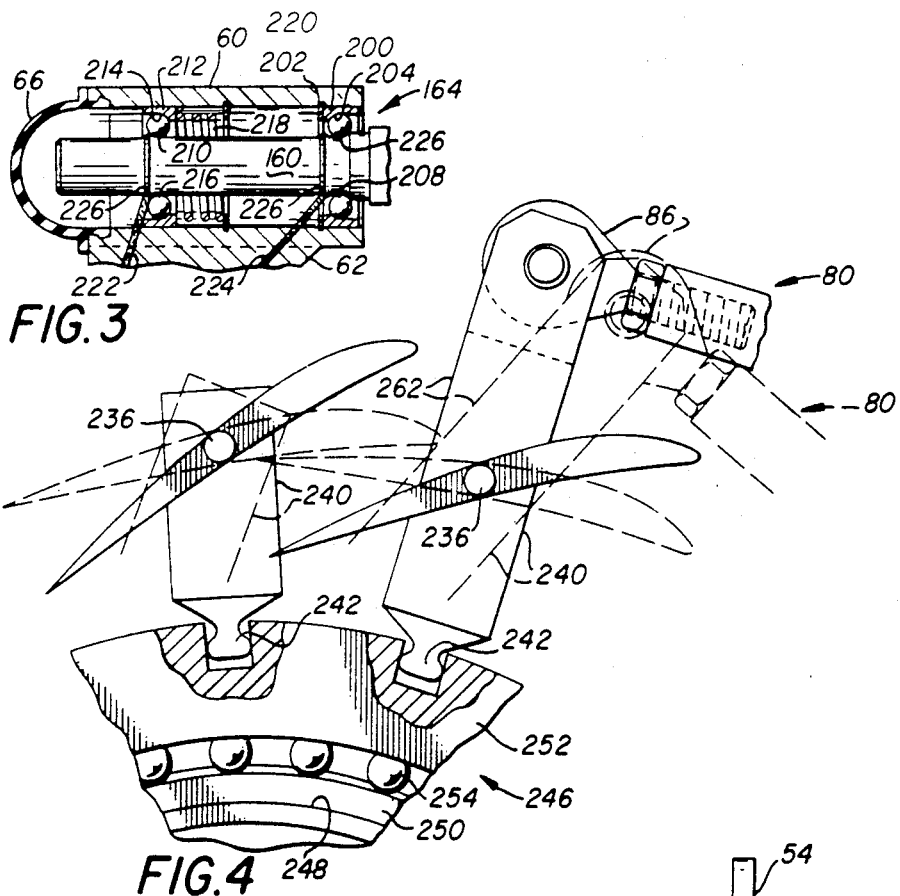
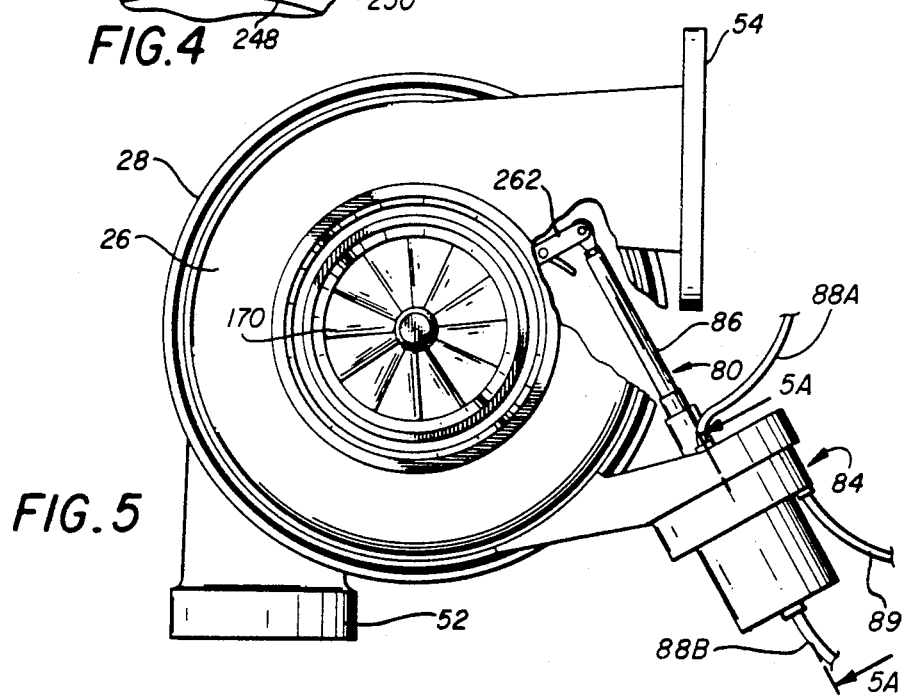

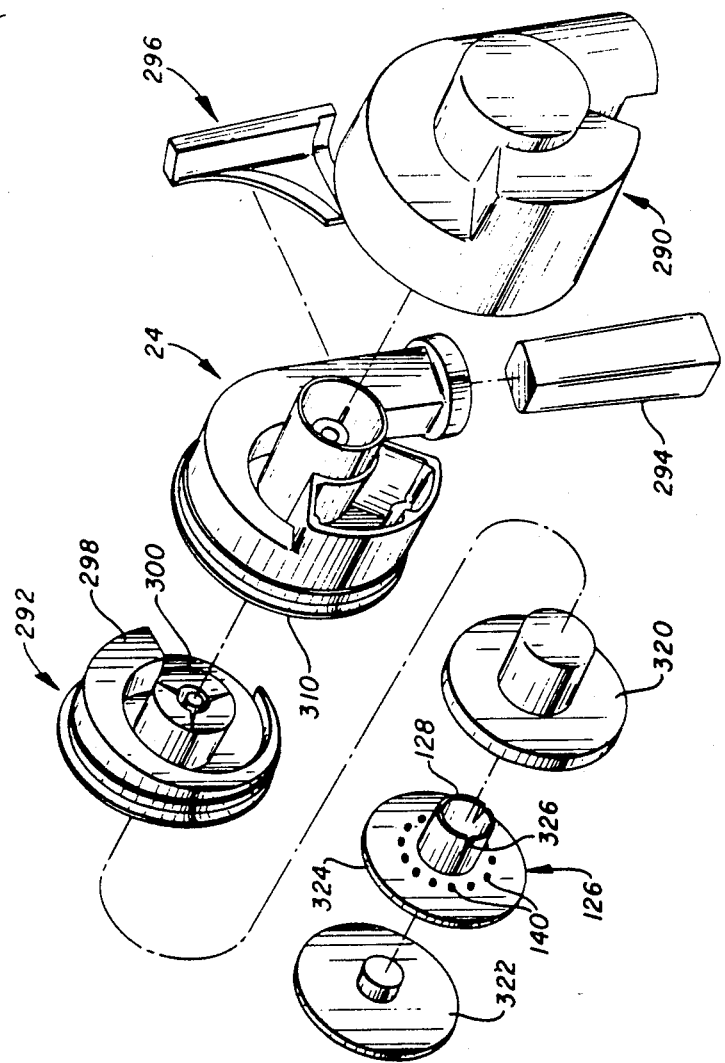

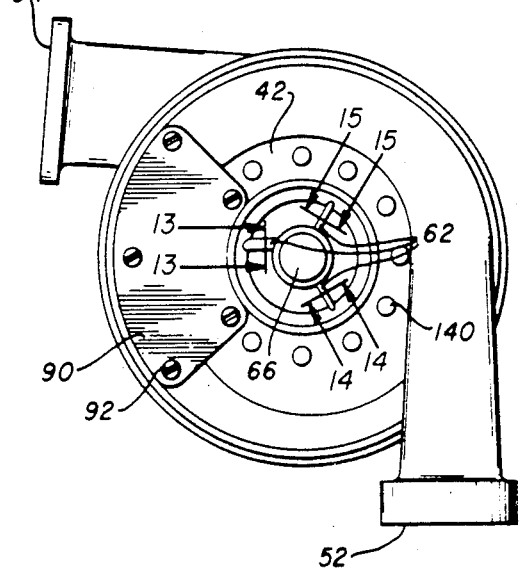
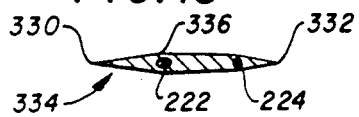
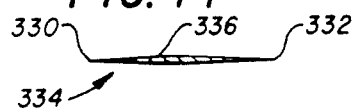
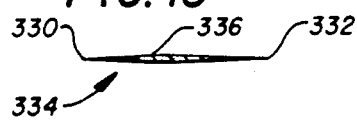
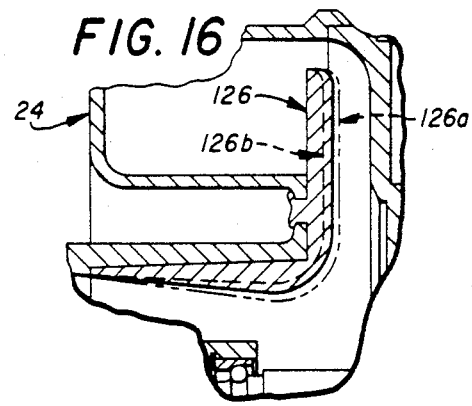

TURBOCHARGER AND ADAPTATIONS THEREOF

CROSS REFERENCE TO RELATED APPLICATION

This is a division of application Ser. No. 38,286 filed May 11, 1979, now abandoned.

This application is a continuation-in-part of application Ser. No. 759,773, filed Jan. 14, 1977, now U.S. Pat. No. 4,179,247 by the present applicant and entitled "Turbocharger."

TECHNICAL FIELD

The present invention relates to turbochargers for use on internal combustion engines and to turbojet and turbofan engines.

BACKGROUND ART

Turbocharging is a means of greatly extending the power range and flexibility of internal combustion engines and has come to be an accepted practice, and in many cases a necessity, for heavy duty diesel engines of 200 or more horsepower. Turbocharging is also used to maintain power at increasing altitude, for instance in aircraft engines.

The effective application of a turbocharger to an internal combustion engine will normally increase power output 50-100 percent and reduce full load specific fuel consumption (sfc) by 5-10 percent. The reduced specific fuel consumption is attributed to two items. First, at a given speed the engine internal friction remains relatively constant even though the power output is increased considerably. This results in an effective improvement in mechanical efficiency. Second, if the efficiencies of the turbocharger components are high enough and the exhaust temperature of the engine on which the turbocharger is used is sufficiently high, there will result a positive pumping loop that adds to the net cycle output.

Turbocharging is normally thought of only as a means for increasing horsepower or decreasing full load specific fuel consumption. In the evolution of engines presently utilizing turbochargers, such as large heavy duty diesel engines, aircraft engines, racing engines and the like, this understanding has been adequate in that in the end application these engines are operated at or near full load for a large portion of the duty cycle. However, most applications do not require that the engine operate at or near full load for extended periods of time. In fact, in most applications, the engine generally is operated below 50% power and in many applications the engine operates well below 20% power during most of its operation. Examples of these applications are engines used in automobiles, light and medium trucks, generator sets, compressors, tractors, construction equipment and the like.

Engines operating at these low power settings are very inefficient. In a diesel engine, this inefficiency is a result of thermal efficiency decay as combustion temperature decreases and because the internal friction remains relatively constant regardless of load. In a gasoline engine, this inefficiency results from pumping loop loss increases with decreasing load and because the internal engine friction remains relatively constant regardless of load.

Thus, by utilizing a smaller "effective engine size," that is, an engine having a smaller displacement rate (the product of $\frac{1}{2}$ displacement times engine speed for a four-cycle engine) by either a reduction in displacement, a reduction in operating speed or a combination of both, the part load fuel consumption may be improved. In gasoline engines, this improvement results from reduced engine friction and reduced pumping loop losses. In diesel engines, this improvement is a result of reduced engine friction and a higher thermal efficiency due to higher combustion temperatures.

In many applications, turbocharging may be used to permit the use of engines having smaller, "effective engine size." By turbocharging, it is relatively easy to obtain twice the naturally aspirated power per cubic inch of displacement and in some cases three times the power. However, attempts to turbocharge smaller engines have generally been unsuccessful. This failure can generally be attributed to the present design of turbochargers which are built around a journal bearing and a flat disc type thrust bearing. This type bearing system requires from one to three horsepower (depending upon the particular turbocharger and the speed required in the application) just to overcome friction. While this loss may be insignificant in applications where turbines are required to develop in excess of thirty horsepower for the compression process (typically engines of 200 or more horsepower), it becomes very significant when turbocharging engines having less than 100 horsepower. For example, where the turbocharger turbine power is 60-80 horsepower, a bearing friction loss of 2-3 horsepower is insignificant. However, in a smaller turbocharger where the turbine power is only 15 horsepower, a bearing friction loss of 2-3 horsepower, or more likely 4-5 horsepower due to the higher rpm at which the smaller turbochargers are operated, represents almost a third of the total turbine horsepower produced and is completely unacceptable.

The presently used bearing systems also require considerable radial and axial clearances to provide for oil flow and rotor stability. These clearances are translated into a relatively large clearance over the blading of the compressor and turbine rotors thereby affecting the efficiency of both the compressor and turbine. For example, the journal and disc thrust bearings, commonly used in present day turbochargers, may require a clearance of 0.015 inches between the turbine and compressor blades and the surround structure. Where the blade height is 1 inch, the clearance to blade height ratio is only 1½ percent. However, where a smaller turbocharger is desired, having blade heights of, for example, 0.2 inches, a clearance of 0.015 inches between the blades and surround structure amounts to 7½ percent of the blade height. Therefore, where a 0.015 inch clearance is acceptable in larger turbocharger applications, it is completely unacceptable when smaller turbochargers are being designed. Therefore, in smaller turbochargers, this clearance becomes more and more critical to the overall performance of the turbocharger and ultimately to the performance of the engine.

The bearing systems now being used in turbochargers are lubricated with engine oil, although most bearing failures are the result of contaminated engine oil or lack of engine oil pressure during starts. Where high speed journal bearings are used in a conventional turbocharger, continuous oil flow is inherently required to provide shaft stability as well as to carry away heat generated by viscous friction. Oil flow is also required to carry away the heat transferred into the bearing system from the adjacent turbine (which operates at temperatures as high as 1600 degrees F.). Even if antifriction ball bearings were substituted for the journal bearings in conventional turbochargers, a continuous oil flow would be required to carry away heat transferred from the turbine. Thus, while lubrication is a necessity for the proper operation of present day turbochargers, lubrication also accounts for many of the failures. Further, continuous oil flow lubrication requires substantial plumbing and associated structure for providing the lubricant to the bearings.

The present day turbochargers have failed to efficiently control the flow of motive gases through the turbine. Presently, there are basically two methods used for controlling power output of the turbine. The first of these methods is by careful sizing of the turbine and turbine nozzle area so that at maximum engine operating speed and load the desired boost pressure will not be exceeded. The disadvantage of this method is that at low engine speeds the available boost pressure is limited and the response to demand is slow. The second method used for controlling the pressure through the turbine is the use of a "wastegate" in conjunction with a turbines nozzle sized to produce excessive turbine power at maximum engine speed and load. In this method, when the predetermined boost pressure is reached, the "wastegate" opens and bypasses a portion of the exhaust gases. While this method increases the available boost at the lower engine speeds and provides improvements in response, it is quite inefficient in that the bypassed, high pressure exhaust gas is simply wasted at the expense of increased engine back pressure. Additionally, at part load, when the turbocharger is essentially inoperative, the small nozzle area acts as a restriction to the exhaust and causes an increase in the pumping loop loss.

Therefore, a need has arisen for a turbocharger which can be efficiently operated to turbocharge both small and large internal combustion engines. The need is for a turbocharger having a bearing system which eliminates the problems heretofore experienced by continuous engine oil lubricated bearings and makes the most efficient use of the motive gases for driving the turbocharger turbine. Further, the bearing assemblies supporting the rotation of the compressor and turbine must facilitate the reduction of the required compressor and turbine rotor clearances.

The present design and method of production of prior art compressor housings for turbochargers have also presented a considerable problem.

Centrifugal flow compressors are one of the most widely used dynamic compressors in turbochargers. In this compressor type, air or an air-fuel mixture enters the compressor inlet, is channeled to the compressor rotor and is accelerated to near sonic speeds at a right angle to the inlet flow path. Increase in air pressure is accomplished by reducing the velocity of the accelerated gases as discharged from the tip of the compressor rotor blades. This process, known as diffusion, is more efficiently achieved by slowing down the gases without turbulence so that a large percentage of the velocity energy is converted into pressure energy, raising the static pressure.

To facilitate this diffusion process, turbochargers employing centrifugal compressors have normally included a compressor rotor wall closely following the contour of the compressor rotor blades from the blade leading edge to its outer tip. This compressor wall then extends past the outer tip of the blade to form one of two walls of the diffuser, then terminates to provide a circumferential gap through which the compressed gases are channeled into a circumferential chamber leading to the intake manifold of the engine. This wall, facing the compressor rotor blades and closely contoured to the rotor blades then extending outward, uniformly decreases the velocity of the gases after the gases leave the rotor blades and prior to their entry into the chamber leading to the engine. Thus, this wall structure greatly increases the static pressure generated by the compressor.

To form this structure, most turbocharger compressor housings have been sand-cast with the compressor wall cast in one piece with the compressor outer surround housing. This has normally been accomplished by using a sand core to form the circumferential chamber leading to the intake manifold of the engine. After casting, this sand core is dislodged to produce the chamber on the opposite side of the wall from the compressor in which gases are channeled off of the tips of the compressor rotor.

Although die-casting of the compressor housing would be substantially less expensive and more accurate than sand-casting, die-casting of an optimum design has not been possible because of the inability to use die-cast molds to form the circumferential chamber which channels the compressed gases to the intake manifold of the engine and at the same time form the diffuser wall. Because the variable area chamber is necessarily larger then the inlet gap through which gases are injected from the compressor rotor blades, die-casting an optimum design compressor housing has not been possible because of the inability to design molds that would form this passageway behind the wall facing the blades of the compressor rotor.

Where die-cast compressor housings are used, the wall normally formed in sand-cast compressor housings is merely deleted so that the molds may be brought together and parted to form the casting. However, without this wall, gases accelerated by the compressor rotor are prematurely dumped from the diffuser into the circumferential chamber leading into the engine intake manifold. As a result, this arrangement realizes a substantially lower compressor efficiency and thus lower performance.

DISCLOSURE OF INVENTION

The present invention provides an improved turbocharger for use with internal combustion engines which overcomes many of the disadvantages heretofore experienced by prior art turbochargers. In accordance with the embodiment of the invention, the turbocharger includes a compressor for supplying air to an engine and a turbine for receiving driving exhaust gas from the engine. The turbine has a shaft integrally attached therewith with which the turbine rotates, and the compressor is fitted on the turbine shaft for rotation with the turbine. The shaft is rotatively supported by bearing assemblies such that the compressor and turbine are overhung to one side of the bearing assemblies with the turbine separated from the bearing assemblies by the compressor. As a result of this arrangement, the bearing assemblies are removed from the turbine and the intense heat to which the turbine is subjected.

In accordance with another embodiment of the invention, antifriction ball bearing assemblies are used for supporting the compressor and turbine shaft. The use of ball bearings is particularly critical in providing better control over the radial and axial movement of the turbine and compressor. This additional control over the movement of the rotating assembly allows reduced blade tip clearances, thereby appreciably improving compressor and turbine efficiency. The use of antifriction ball bearings further reduces the turbine work required, thereby improving the specific fuel consumption of the engine.

In one embodiment of the present invention, the bearing assemblies include a first and second inner raceway formed in the compressor and turbine shaft. A fixed outer raceway corresponding to the first inner raceway is attached to the turbocharger housing and a plurality of balls are received between the fixed outer raceway and the first inner raceway. A second outer raceway ring is provided and is slidable relative to to the first outer raceway. This second outer raceway ring is slidable relative to the housing and a compression spring acts between the turbocharger housing and the ring to bias the ring away from the first outer raceway and in engagement with balls positioned between the ring and the second inner raceway. Simultaneously therewith, the first outer raceway, attached to the turbocharger housing, is engaged against the balls between such raceway and the first inner raceway on the turbine and compressor shaft.

In accordance with another embodiment of the invention, a turbocharger includes a variable area turbine nozzle having a plurality of nozzle vanes spaced circumferentially about the turbine and in the inlet through which exhaust gas from the engine is received into the turbine. A control linkage system is positioned intermediate of the compressor and turbine and controls the position of the nozzle vanes to vary the flow velocity of exhaust gases into the turbine. In one embodiment of the invention, the variable area turbine nozzle control linkage system includes a control ring having an outer ring movable angularly relative to an inner ring. An actuation lever is rotatable with each vane and has one end engaged in the outer ring of the control ring. A control rod is attached to one of the actuation levers and structure is provided for selectively moving the control rod to pivot the actuation lever attached thereto. This in turn rotates the outer ring of the control ring thereby pivoting each of the actuation levers and the vanes attached thereto.

The use of variable area turbine nozzles provides more efficient control of peak boost pressure while allowing greater boost at lower engine speeds than now attainable. Variable area nozzles also improve transient response and provide a better part load specific fuel consumption in that the nozzle area can be opened to minimize engine back pressure during part load operation. Further, nozzles can be positioned to optimize emissions. Moreover, the present invention provides a very straightforward arrangement for conveniently controlling a plurality of nozzle vanes circumferentially spaced in the turbine inlet. The control linkage is conveniently positioned in the unused space intermediate of the compressor and turbine and in addition to providing for a very compact turbocharger "package", the control linkage space further provides an insulation shield between the heat of the turbine area and the bearing assembly supporting the compressor and turbine shaft.

In one embodiment of the invention, the compressor rotor housing unit includes a compressor housing and a compressor wall insert for mating with the compressor housing. The compressor housing includes a tubular shaped inlet port having a transverse wall attached to one end of the tubular port and extending outwardly therefrom. A circumferential chamber is formed in the wall opposite the inlet port and has a circumferential opening substantially in the plane of the wall. The circumferential chamber also has an opening which communicates with the intake manifold of the engine to which the turbocharger is attached.

The wall insert is formed having a tubular throat with a circular disc attached at one end of the tubular throat transverse thereto. The disc has an aperture corresponding to the opening formed by the tubular throat. Rivet-like protrusions are integrally formed and extend from the disc corresponding to and facing apertures formed in the wall of the compressor housing. These protrusions are circumferentially spaced around the tubular throat and correspond in position to the apertures formed around the inlet port in the transverse wall of the compressor housing. The protrusions engage the apertures to join the insert to the compressor housing such that the circular disc forms a forward diffuser wall of the turbocharger.

The tubular throat of the insert fits within the inlet port allowing the circular disc to abut the transverse wall of the compressor housing for engagement thereto. The disc extends beyond the transverse wall and partially encloses the opening in the plane of the wall of the circumferential chamber.

In accordance with one embodiment of the invention, the inlet port is formed with an inside surface having a first portion remote from the transverse wall with a varying diameter converging toward the wall and a second portion adjacent the compressor housing transverse wall diverging in diameter toward the wall. The tubular throat of the wall insert has an inside surface converging in diameter toward the circular disc and an outside surface diverging in diameter toward the disc to mate with the diverging inner surface of the inlet port of the compressor housing. The inner surface of the throat portion of the wall insert converges at substantially the same rate as the inlet port inner surface to form a continuous converging surface from the opening into the inlet port to the area adjacent the insert disc where the compressor rotor is positioned.

As is now appreciated, the compressor housing unit consists of two components which are cast separately and joined to form the completed unit. By so doing, the components are designed so that they may be die-cast while still providing a forward diffuser wall for closing the circumferential chamber except for an annular gap through which compressed air is channeled from the blade tips of the compressor rotor.

In accordance with another embodiment of the invention, the housing unit further includes a bearing support cylinder positioned from the inner wall of the inlet port by a plurality of vanes extending from the inner wall. The vanes are aligned to be substantially radial from the center line of the inlet port with a leading edge facing the opening to the inlet port and a trailing edge substantially opposite the leading edge. The leading and trailing edges are separated by thicker intermediate vane sections.

In accordance with still another embodiment of the invention, one end of the tubular throat of the compressor wall insert is notched to correspond with the vanes such that the throat straddles the vanes when the tubular throat is inserted within the inlet port.

In accordance with still another embodiment of the invention, a turbocharger having a compressor rotor and turbine rotor mounted for rotation on a shaft supported in a housing forming an inlet to the compressor rotor includes a concentrically positioned cylindrical module mounted within the inlet upstream of the compressor rotor and supported from the inlet wall by struts extending from the inlet wall to the cylindrical module. The struts divide the inlet into more than one inlet passage. The compressor inlet has a converging inner wall from the mouth of the inlet to the compressor rotor. The struts are formed with a leading and trailing edge thinner than the portion of the strut intermediate thereof. The inlet diameter is shorter than the length of the inlet. In a more specific embodiment of the invention, three struts extend substantially radially from the cylindrical module to the side wall of the inlet and divide the inlet into three inlet passages.

It has been found that this inlet structure substantially eliminates the surge area normally encountered by conventional turbochargers at low compressor flows and allows the turbocharger to continue to function at low compressor flows and corresponding low engine speeds without producing unstable flow at low operating speeds.

In accordance with still another embodiment of the invention, the turbocharger further includes control structure for varying the velocity of exhaust air to the turbine rotor in response to the speed of the rotor shaft to maintain the compressor rotor speed at any desired level at various engine conditions. A plurality of nozzle vanes are spaced around the turbine rotor and in the inlet through which exhaust air from the engine is received to the turbine rotor. Control structure is provided for rotating the nozzle vanes to vary the flow of exhaust air to the turbine rotor. A shaft speed monitor operates to control the position of the nozzle vanes in accordance with the speed of the shaft such that the nozzle vanes are moved to reduce the inlet area to the turbine rotor when the shaft speed drops below a predetermined level and to increase the inlet area to the turbine rotor when the speed of said shaft increases above a predetermined value. In this way, the speed of the turbine and the compressor driven by the turbine is controlled as desired without regard to the engine speed.

In accordance with still another embodiment of the invention, an axial compressor is mounted on the compressor rotor and turbine rotor shaft in the turbine compressor air inlet upstream of the radial compressor. The axial compressor operates to compress air passing into the air inlet prior to introduction of the air to the radial compressor. The radial compressor and turbine rotors are overhung to one side of the shaft bearing support structure and the axial compressor rotor is mounted on the shaft on the side of the bearing support structure opposite the radial compressor and turbine.

In accordance with still another embodiment of the invention, an armature is mounted for rotation with the shaft and a field winding is mounted in the turbocharger housing adjacent the armature such that an electric current is produced by the rotation of the armature with the shaft within the field winding. In accordance with a more specific embodiment of the invention, wherein the shaft is supported for rotation in a bearing housing supported from the compressor and turbine rotor housing, the field winding is mounted in the bearing housing.

In accordance with one embodiment of the invention, the turbocharger described above is mounted to an internal combustion engine with the turbine and compressor axis of rotation in a vertical orientation. When mounted to a "V" engine, the turbocharger is nested between the cylinder banks with the engine exhaust ported directly from the cylinders to the turbocharger to drive the turbine rotor.

In accordance with another embodiment of the invention, the basic structure of the turbocharger may be modified to operate as a turbojet. In this embodiment, the turbojet includes a shaft, having a turbine rotor and first compressor rotor mounted on the shaft. Bearing structure is provided for rotatively supporting the shaft within a housing such that the compressor and turbine rotors are overhung to one side of the bearing structure with the bearing structure on the side of the compressor rotor opposite the turbine rotor. An air flow channel is formed within the housing for directing air to the compressor rotor and thereafter to the turbine rotor. Structure is provided for introducing fuel within the air flow channel to form an air fuel mixture within the air flow channel. An ignitor is provided within the air flow channel intermediate of the compressor rotor and turbine rotor for igniting the air fuel mixture to drive the turbine and provide thrust from the turbojet.

In accordance with a more specific embodiment of the invention, the turbine rotor and compressor rotor shaft has an axial bore formed therein. Ports communicate between the axial bore and the shaft and through the compressor rotor to the air flow channel providing for fuel from the axial bore in the shaft to move from the bore to the air flow channel. Fuel is supplied to the bore of the shaft and is directed by centrifugal force during the rotation of the compressor rotor from the bore in the shaft through the compressor rotor to the air flow channel thereby eliminating the need for a fuel pump.

In accordance with still a further embodiment of the invention, an axial compressor is mounted on the shaft upstream of the first compressor rotor for compressing air moving into the air flow channel. The axial compressor rotor is mounted on the side of the bearing structure opposite the first compressor rotor. This structure provides a higher cycle pressure ratio while maintaining lower centrifugal stresses. Alternatively, where compressor rotor stresses are not critical, a much higher cycle pressure ratio may be achieved.

In accordance with still a further embodiment of the invention, an armature is mounted on the shaft within the air flow channel and on the side of the bearing structure opposite the first compressor rotor. A field winding is mounted in the housing adjacent the armature, whereby electric current is produced when the armature rotates relative to the field winding. Use of rare earth metals such as selenium-cobalt would permit current generation at the high rotative speeds.

In accordance with still a further embodiment of the invention, a turbofan is provided including a turbine rotor and first compressor rotor mounted on a shaft for rotation thereon. The shaft is supported by bearing structure mounted within a housing such that the compressor and turbine rotors are overhung to one side of the bearing structure. An axial compressor having an axial compressor rotor is mounted on the shaft on the side of the bearing structure opposite the first compressor rotor. A primary air flow channel is formed within the housing for directing air to the axial compressor, then to the first compressor rotor and thereafter to the turbine rotor. A fuel system introduces fuel within the air flow channel to form a fuel air mixture within the primary air flow channel and an ignition source is positioned within the air flow channel intermediate of the compressor and turbine rotors to ignite the air fuel mixture. A bypass channel is also formed within the housing to channel a portion of the inlet air subsequent to compression by the axial compressor through a second nozzle. The axial compressor rotor is adapted with an armature which cooperates with a stationary field winding to produce electric current.

BRIEF DESCRIPTION OF THE DRAWINGS

For a more complete understanding of the present invention, and for further details and advantages thereof, reference is now made to the following description taken in conjunction with the accompanying drawings, in which:

FIG. 1 is a perspective view of the turbocharger of the present invention,

FIG. 2 is a vertical section taken along lines 2—2 of the turbocharger illustrated in FIG. 1, FIG. 3 is an enlarged view of the bearing assemblies supporting the compressor and turbine shaft of the present invention, FIG. 4 is an enlarged section view taken along line 4—4 of FIG. 2 with the compressor backwall removed for clarity, FIG. 5 is a partially broken away end view as viewed from line 5—5 of FIG. 2 looking in the direction of the arrows, FIG. 11 is an exploded perspective view showing the two components of the compressor housing unit separated from molds used to make the components, FIG. 12 is a frontal view looking into the inlet port of the turbocharger illustrated in FIG. 1, FIG. 13 is a section view taken along line 13—13 of FIG. 12, FIG. 14 is a section view taken along line 14—14 of FIG. 12, FIG. 15 is a section view taken along line 15—15 of FIG. 12, FIG. 16 illustrates an alternative embodiment of the present invention wherein the forward diffuser wall is modified to modify the turbocharger characteristics.

DESCRIPTION OF THE PREFERRED EMBODIMENTS

Figures 5A, 6A:
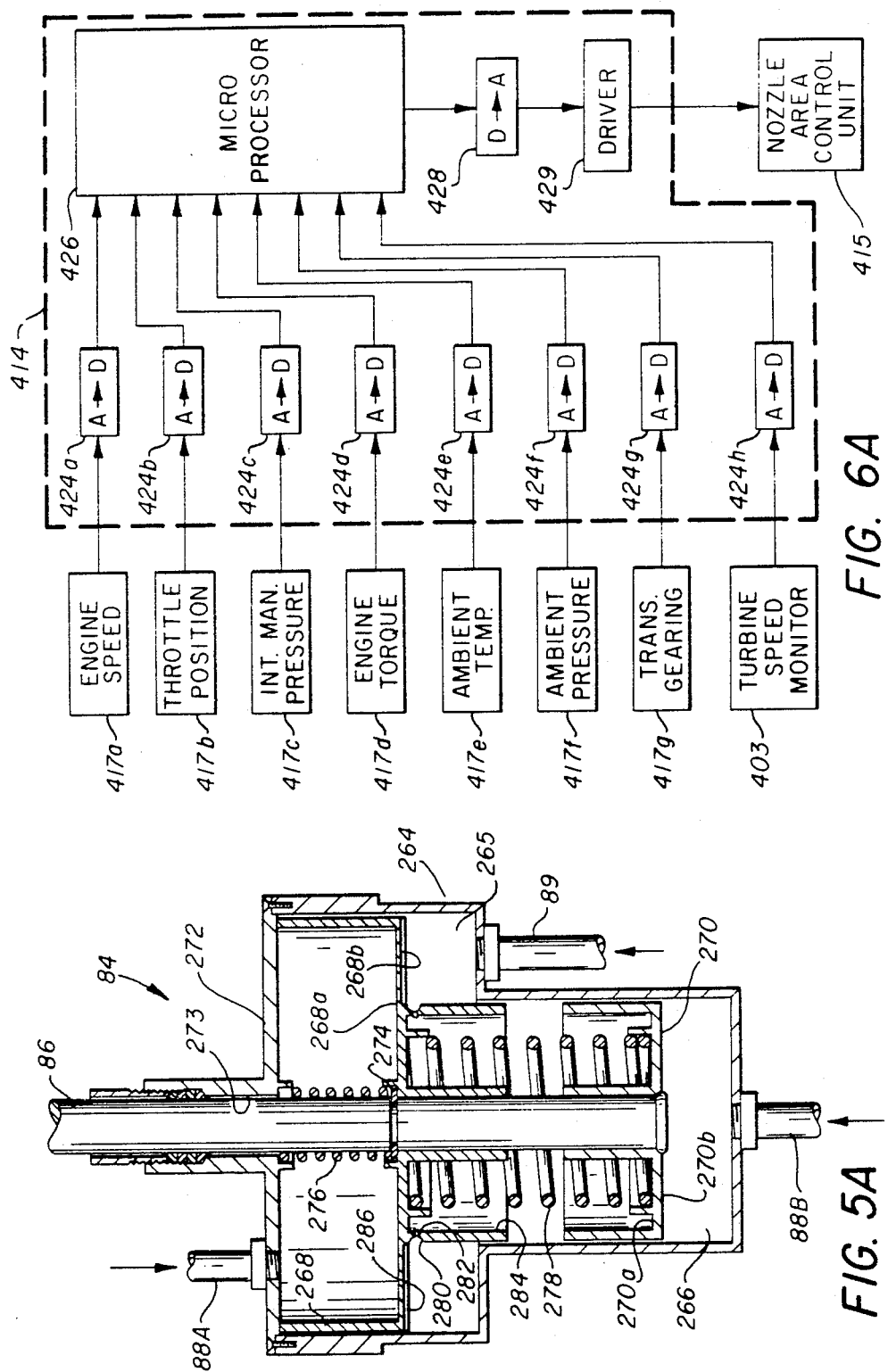
FIG. 5a is a section view taken along line 5a—5a of FIG. 5 looking in the direction of the arrows.
FIG. 6a is a block diagram further illustrating the control unit illustration in FIG. 6.

FIG. 1 is a perspective view of a turbocharger 20 embodying the present invention. The turbocharger includes an outer structure 22 consisting of a compressor housing unit 24 coupled to a turbine housing unit 26 by a V-clamp band 28.

Referring to FIGS. 1 and 2, compressor housing unit 24 includes a tubular inlet port 40 with a transverse wall 42 attached to one end of port 40 and extending outwardly therefrom. A circumferential chamber 44 is attached from wall 42. Inlet port 40 defines a compressor air inlet 50 and circumferential chamber 44 defines a compressor exhaust 52. Turbine housing 26 defines a turbine air inlet 54 and a turbine exhaust 56.

In operation of the turbocharger, air is drawn into inlet 50 and compressed air is discharged from exhaust 52 to an internal combustion engine to which the turbocharger is mounted. Exhaust air from the engine is channeled into turbine air inlet 54 to drive the turbocharger turbine and is exhausted through turbine exhaust 56.

Referring still to FIGS. 1 and 2, a bearing support cylinder 60 is mounted within inlet port 40 by a plurality of vanes 62 extending from the inside wall surface 64 of inlet port 40. A cap 66 is mounted over the end of support cylinder 60. A piston type actuator 80 is mounted by bracket 82 (FIG. 1) to turbine housing 26. Actuator 80 includes a controller 84 operated to extend and retract control rod 86 as will be discussed hereinafter in greater detail. Air lines 88 and 89 provide air to controller 84 as necessary to operate rod 86. An oil reservoir cover plate 90 is attached to compressor housing unit 24 by a plurality of screws 92.

Referring specifically to FIG. 2, a compressor backwall 100 and a turbine backwall 102 are positioned intermediate of compressor housing unit 24 and turbine housing unit 26 when these two units are assembled. These four components are piloted one to another and held in assembly by V-clamp 28. As can be appreciated from a close review of FIG. 2, only a single V-clamp is required to hold the entire assembly together. As previously described, compressor housing unit 24 includes a tubular inlet port 40 with a transverse wall 42 attached to one end thereof to one of the inlet ports and extending outwardly therefrom. A circumferential chamber 44 is attached to the end of wall 42 remote from inlet port 40 and has a varying area around its circumference increasing to the discharge provided by compressor exhaust 52 (FIG. 1).

Inlet port 40 has a first inside wall portion 110 having a converging diameter toward wall 42 and a second inside wall portion 112 joined to first inside wall portion 110 by a step 114. The second inside wall portion 112 has a diverging diameter toward wall 42. Wall 42 has a plurality of circumferentially spaced apertures 116 therethrough. Chamber 44 has an opening 118 substantially in the plane of wall 42 in addition to compressor exhaust 52.

A forward compressor wall insert 126 includes a tubular throat 128 and a circular disc 130 attached transversely from one end of throat 128. Throat 128 has an inside wall surface 131 having a diameter converging toward disc 130 and an outer surface 132 having a diameter diverging toward disc 130. The diverging diameter surface 132 corresponds to the diverging surface of inside wall portion 112 of inlet port 40 such that throat 128 may be inserted within and mated with inlet port 40. The converging diameter inside wall surface 131 of throat 128 corresponds to the extension of converging diameter of first inside wall portion 110 of inlet port 40. When insert 126 is mated into inlet port 40, a continuous converging diameter is provided from the inlet of port 40 inwardly into the turbocharger.

A plurality of rivet-like protrusions 140 extend from disc 130 and correspond to apertures 116 in wall 42. With the insert engaged to compressor housing 24 with the end of throat 128 engaging step 114 of inlet port 40, protrusions 140 are engaged through apertures 116 with disc 130 abutting the corresponding surface of wall 42. As is shown in FIG. 2, protrusions 140 have been inserted into apertures 116 and the heads thereof deformed to attach insert 126 to housing 24. Disc 130 extends beyond wall 42 to partially cover opening 118 of chamber 44. A circumferential gap 146 is formed between the outer tip of disc 130 and the wall of chamber 44, and a diffuser area 148 is formed between disc 130 and compressor backwall 100 between centrifugal flow compressor rotor 172 and gap 146 leading to chamber 44.

Referring still to FIG. 2, bearing support cylinder 60 is supported concentrically within inlet port 40 by a plurality of vanes 62 extending inwardly from wall surface 64 of port 40. Turbocharger 20 further includes a shaft 160 supported for rotation in bearing support cylinder 60 by two ball bearing assemblies 162 and 164. A radial flow turbine rotor 170 is mounted at one end of shaft 160 and a centrifugal flow compressor rotor 172 is mounted intermediate of turbine rotor 170 and bearing assemblies 162 and 164. Shaft 160 passes through aperture 176 in compressor backwall 100 and labyrinth seal 178 in turbine backwall 102.

Turbine rotor 170 is fixedly attached to shaft 160, such as by welding, and compressor rotor 172 is retained in position on shaft 160 by retainer nut 180. Compressor rotor 172 is drilled to receive shaft 160 and counterbored to form a bore 182. Bore 182 has a diameter larger than the outer diameter of retainer nut 180 such that retainer nut 180 may be pressed onto shaft 160 into engagement with the bottom wall 184 of bore 182 to retain the compressor rotor in position on shaft 160. A compressor rotor shim 186 is positioned between compressor rotor 172 and a step 188 in shaft 160 to accurately position the compressor rotor in the axial direction.

Referring to FIGS. 2 and 3, a ring 200 is fitted within the end of cylinder 60 adjacent compressor rotor 172 and is prevented from moving into cylinder 60 by a retaining ring 202 attached to cylinder 60. Outer raceway 204 of bearing assembly 164 is formed in ring 200, the inner raceway 206 being integrally formed in shaft 160. Balls 208 are engaged between the inner and outer raceways to form bearing assembly 164.

Bearing assembly 162 includes inner raceway 210 formed integrally in shaft 160 and an outer ring 212 slidable within cylinder 60 with an outer raceway 214 formed therein for receiving balls 216. A compression spring 218 is engaged between ring 212 and a retaining ring 220 fixed within cylinder 60 and biases ring 212 outwardly to fix the position of balls 216 and 208 in bearing assemblies 162 and 164, respectively, thereby fixing the position of shaft 160.

As is shown in FIGS. 2 and 3, outer raceway 204 is formed in ring 200 with the ball radius on only one side. Thus, the assembly of bearing assembly 164 is made by positioning a full complement of balls 208 in raceway 206, and engaging ring 200 therearound. Similarly, outer raceway 214 is formed in ring 212 with the ball radius on only one side. Balls 216 of bearing assembly 162 are assembled by moving outer ring 212 to compress spring 218 and inserting a full complement of balls 216 in raceway 214 of shaft 160. By releasing ring 212, spring 218 automatically forces the ring into engagement with balls 216 to form bearing assembly 162 while simultaneously engaging ring 200 against balls 208 of bearing assembly 164.

Alternatively, less than a full complement of balls 208 and 216 may be used in bearing assemblies 162 and 164 by the use of an appropriate retainer. Depending upon the application, an oil impregnated retainer or a sacrificial retainer which replenishes a self-lubricating coating to the balls may be used. The mounting of shaft 160 within cylinder 60 is completed by the engagement of cap 66 on the end of cylinder 60 to close the opening in cylinder 60 remote from compressor rotor 172.

The use in the present bearing system of the ball bearing arrangement employing integral inner raceways permits a larger diameter shaft and thus provides a very "stiff" shaft. Additionally, this bearing arrangement provides a very tight bearing system permitting very little radial or axial movement. As a result, the present bearing system substantially reduces the clearance required between the compressor and turbine and surrounding housing, and concentricity problems are minimized.

In a preferred embodiment of the invention, bearing assemblies 162 and 164 are "starved" of oil. The only lubrication provided to the bearing assemblies is through wicks 222 and 224 which transfer oil from a reservoir R by capillary action to ramps or slingers 226. Oil supplied to slingers 226 is projected by centrifugal force to bearing assemblies 162 and 164 during rotation of shaft 160.

In this way, the use of engine oil as a lubricant for the turbocharger bearings, and the associated plumbing and seals are eliminated. Moreover, the failures resulting from the use of contaminated engine oil as a lubricant or the lack of engine oil during starts is avoided. Moreover, no oil seals are required and bearing failure resulting from the failure of seals is also eliminated.

Alternatively, the bearing assemblies may be permanently lubricated with a heavy consistency oil or grease which is packed into the raceways and around the balls of the bearing assemblies. As another alternative, an oil impregnated phenolic retainer may be used to provide lubricant to the balls for a considerable period. In either of these cases, the need for wicks 222 and 224 and slingers 226 would be eliminated although with a reduced bearing life.

In conventional turbochargers where journal bearings and disc type thrust bearings are employed, continuous lubrication of the bearings is required. Additionally, because the turbine is subjected to temperatures up to 1600° F., where the bearings are adjacent the turbocharger turbine, continuous lubrication is required to sufficiently cool the bearings to prevent failure through overheating. Even ball bearings would require a continuous flow of oil for cooling. The ability of the present system to successfully function without conventional flood lubrication used to both lubricate and cool the bearings is the result of the particular arrangement of the type of bearings used in the present invention and the relative location of the bearings to the compressor and turbine.

As will be described hereinafter in greater detail, because the present invention eliminates the need for a continuous flow of oil for bearing lubrication and cooling, the present turbocharger may be mounted at any desired orientation. In contrast, conventional turbochargers have been severely limited as to their possible orientation.

In the present invention, the journal and disc bearings of conventional turbochargers are replaced by the more precise ball type bearing assemblies, thereby eliminating the need for a continuous flow of lubrication for the bearings. Additionally, both the compressor and the turbine of the present turbocharger are overhung to one side of the bearing assemblies, and the turbine is maximally removed from the bearing assemblies with the compressor positioned between the bearing assemblies and the turbine. As this arrangement provides sufficient thermal insulation between the turbine and the bearing assemblies, the bearings will not be sufficiently heated as to require conventional lubrication methods.

The back to back compressor/turbine arrangement of the present invention not only reduces substantially the heat conducted to the bearing assemblies but also minimizes the thermal expansion effects, thereby lowering the blade tip clearances required. This arrangement further eliminates the conventional bearing housing and provides a more compact package than present straddle mounted rotors having the support bearings intermediate of the compressor and turbine.

Additionally, the use of antifriction ball bearing assemblies 162 and 164 provides much better control over the radial and axial movement of the compressor and turbine, thereby allowing reduced blade tip clearance. This in turn appreciably improves the compressor and turbine efficiency. Compared to journal bearings, the use of the antifriction ball bearing assemblies 162 and 164 also reduces the turbine work required to drive the bearings. This in turn reduces the engine back pressure resulting in the improvement of the specific fuel consumption as well as enhancing the ability to accelerate the rotor.

The present invention is also directed to a nozzle area control structure 228 for selectively varying the turbine nozzle area to control the speed or pressure output of the turbocharger. Referring to FIGS. 1 and 2, exhaust gas from the internal combustion engine on which the turbocharger is mounted is injected into the turbocharger through turbine air inlet 54 and channeled against the blades of turbine rotor 170 through a nozzle area 230 formed by turbine backwall 102, a wall 232 parallel thereto and the nozzle vanes 234. This nozzle area is controlled by structure 228 including a plurality of movable nozzle vanes 234 positioned circumferentially about the nozzle area and rotatable to vary flow velocity and angle of exhaust gas to turbine rotor 170. Referring to FIGS. 2 and 4, vanes 234 include trunnions 236 and 238 extending from opposite sides thereof. Trunnion 236 extends through turbine backwall 102 and is attached to actuation lever 240. Trunnion 238 extends into wall 232.

A nipple 242 is formed on one end of each actuation lever. These nipples extend into radial slots 244 formed in a control ring 246. Control ring 246 and actuation levers 240 are situated in air space gap 247 intermediate of compressor rotor 172 and turbine rotor 170. Control ring 246 is concentrically positioned about the axis of shaft 160 and is received on a cylindrical surface 248 extending from compressor backwall 100.

In a preferred embodiment of the invention, control ring 246 includes an inner ring 250 and an outer ring 252 formed with an inner and outer raceway, respectively, for receiving a plurality of balls 254 therebetween. Inner ring 250 is fixedly attached to the cylindrical surface 248 extending from compressor backwall 100, and outer ring 252 rotates angularly relative to the inner ring. Referring to FIG. 4, it is seen that by the rotation of outer ring 252, each of the actuation levers 240 is rotated about the axes of trunnions 236 and 238, resulting in the simultaneous rotation of each nozzle vane 234. As is shown in FIGS. 4 and 5, one of the actuation levers 240 is provided with an extension 262. Control rod 86 is attached to the end of extension 262 remote from nipple 242. Control rod 86 includes a threaded eye bolt 86a attached to the extension 262 by an axis pin. The opposite end of eye bolt 86a is threadedly received within control rod 86 and is adjustable therein to allow for the readjustment of nozzle vanes 234 about their rotational axes. By the improvement of control rod 86, actuation lever 240 is pivoted to angularly rotate outer ring 252 of control ring 246 thereby rotating each of the other actuation levers 240 and nozzle vanes 234 attached thereto.

Referring to FIG. 5, an actuator for use on an otto cycle engine is shown. In the system illustrated, control rod 86 is controlled by a piston type actuator 80. Alternatively, the pistons could be replaced by diaphragms. Actuator 80 is controlled by compressor discharge pressure fed into controller 84 through line 88. Increased pressure into actuator 80 causes the extension of control rod 86 and the corresponding opening of the compressor nozzle area.

Referring to FIG. 5a, control rod 86 is controlled by controller 84 to vary the position of nozzle vanes 234. Controller 84 includes a housing 264 defining a large cylinder 265 and a small cylinder 266 therein. A large piston 268 having a forward face 268a and a rearward face 268b is received within cylinder 265. A smaller piston 270 having a forward face 270a and a rearward face 270b is received within small cylinder 266. A front plate 272 is attached to housing 264 by suitable bolts and has an aperture 273 therein for receiving control rod 86 into the housing. Piston 270 is fixedly attached to the end of control rod 86 while piston 268 is free to slide relative to control rod 86 being arrested only by ring 274 fixedly attached to control rod 86 adjacent forward face 268a of piston 268.

A spring 276 is entrained around control rod 86 and captured between piston 268 and front plate 272. A larger spring 278 encircles control rod 86 and is captured between piston 270 and piston 268. Air lines 88a and 88b communicate to cylinder 266 to the rearward face 270b of piston 270 and within cylinder 265 to the forward face 68a of piston 268. Air lines 88a and 88b have their ends opposite controller 84 attached to the engine intake manifold to convey manifold pressure to the forward face 268a and rearward face 270b of pistons 268 and 270, respectively. Line 89 provides atmospheric pressure to the rearward face 268b and forward face 270a of pistons 268 and 270, respectively.

Annular grooves 280 and holes 282 through guide cylinder 284 protruding from the rearward face 268b of piston 268 assures the transmission of atmospheric pressure along the full back surface of piston 268. Likewise, radial grooves 286 on the rearward face of piston 268 facilitate the communication of pressure to the full surface of the rearward face of the piston.

Controller 84 is designed to extend control rod 86 to open nozzle vanes 234 to turbine rotor 170 at low and high manifold pressures and to retract control rod 86 to close these nozzle vanes at intermediate pressures. More specifically, while operating at a closed throttle position where the intake manifold is under a vacuum condition, for example with manifold pressures of 5 to 8 pounds per square inch absolute, the controller operates to extend rod 86 to open nozzle vanes 234 permitting the engine to operate with as little back pressure as possible. This results from the larger atmospheric pressure (approximately 14.7 psi absolute) exerted on rearward face 268b of piston 268 from line 89 compared to pressure from line 88 which is substantially less than atmospheric pressure.

While the net pressure differential across piston 270 provides a force tending to retract control rod 86, the surface areas of pistons 268 and 270 are designed so that the outward force on piston 268 is sufficient to overcome both the retractive pressure on piston 270 as well as the spring force of spring 276.

The piston size and spring rate of spring 276 are designed such that as the manifold pressure nears atmospheric pressure, such as 12 pounds per square inch absolute, control rod 86 is drawn within controller 84 to close nozzle vanes 234 thereby increasing the speed of turbocharger 20 and the pressure ratio provided from the turbocharger compressor. Controller 84 is designed to begin closing vanes 234 immediately before atmospheric pressure is reached because this intake manifold pressure corresponds to an open carburetor throttle and thus indicates a requirement for turbocharger boost.

Referring to FIG. 5a as the manifold pressure in line 88a exerted against forward face 268a of piston 268 nears atmospheric pressure, this pressure in conjunction with the action of spring 276 overcomes the atmospheric pressure exerted from line 89 on the rearward face 268b of piston 286 to withdraw control rod 86 within controller 84. The pressure differential across piston 270 still provides a net force retracting piston 270 within its cylinder thus assisting in the retraction of control rod 86 within controller 84.

As the manifold pressure increases to a value in excess of atmospheric pressure, for instance 20 pounds per square inch absolute, the manifold pressure exerted through line 88b on the rearward face 270b of piston 270 overcomes the spring force of spring 278 causing the movement of control rod 86 outwardly from controller 84 to again open vanes 234 thereby preventing overpressurization. Control rod 86 is extended from controller 84 in this pressure situation even though piston 268 is retained in a fully retracted position within cylinder 265 because of the capability of control rod 86 to move freely relative to piston 268 when piston 270 overcomes the spring force of spring 278 to move toward piston 268.

Therefore, the present controller provides a system for opening the nozzle vanes 234 at manifold pressures having an absolute reading below a predetermined value less than atmospheric as provided for by the design of the controller and components therein. Likewise, the controller provides for the closing of vanes 234 at manifold pressures ranging from some predetermined value less than atmospheric to some value greater than atmospheric pressure and for the opening of vanes 234 at manifold pressures in excess of a predetermined value above atmospheric pressure. Of course, it will be understood that the particular pressures at which the vanes are opened and closed can be readily altered by variation of the areas of pistons 268 and 270 and the variation in the spring rates and initial deflections of springs 276 and 278.

For diesel cycle engines, a solenoid may be used to control piston 268 such that the solenoid maintains shaft 86 in an extended position during light load operations of the engine but releases the shaft when a heavy load is demanded. Upon release of the shaft, spring 276 retracts shaft 86 to close the nozzles thereby increasing turbocharger speed. When sufficient pressure is communicated from the intake manifold to face 270b of piston 270, shaft 86 is extended as previously described to open the nozzles thereby controlling manifold pressure.

In operation of the variable area turbine nozzle, a control signal, such as compressor discharge pressure, is communicated to actuator 80 which appropriately extends or retracts control rod 86 in accordance with the signal to actuator 80. This in turn results in the rotation of actuation lever 240 attached to control rod 86 and the simultaneous angular rotation of outer ring 252 of control ring 246. The rotation of outer ring 252 in turn rotates such actuation lever 240 to correspondingly set the angle of nozzle vanes 234.

FIG. 4 shows in phantom and solid lines nozzle vanes 234 in closed and open positions. It will be appreciated that each of the nozzle vanes is set by the rotation of control ring 246 through the movement of a single control rod 86 controlled by a single actuation lever 240.

Conventional uncontrolled turbochargers normally produce a boost pressure directly related to compressor speed, with compressor speed generally corresponding to engine speed. Therefore, boost pressure in conventional uncontrolled turbochargers is substantially less at low engine speeds than at higher engine speeds. Therefore, at a low engine speed a conventional turbocharger is ineffective in improving engine performance. Moreover, upon acceleration, there is a substantial "lag time" until the turbocharger reaches a speed producing a sufficient boost pressure to effectively improve engine performance.

The turbocharger of the present invention may be controlled to provide boost pressure at low engine speeds. This results in improved engine performance at lower engine rpm and eliminates or reduces the "lag time" associated with conventional turbochargers.

Figure 6:
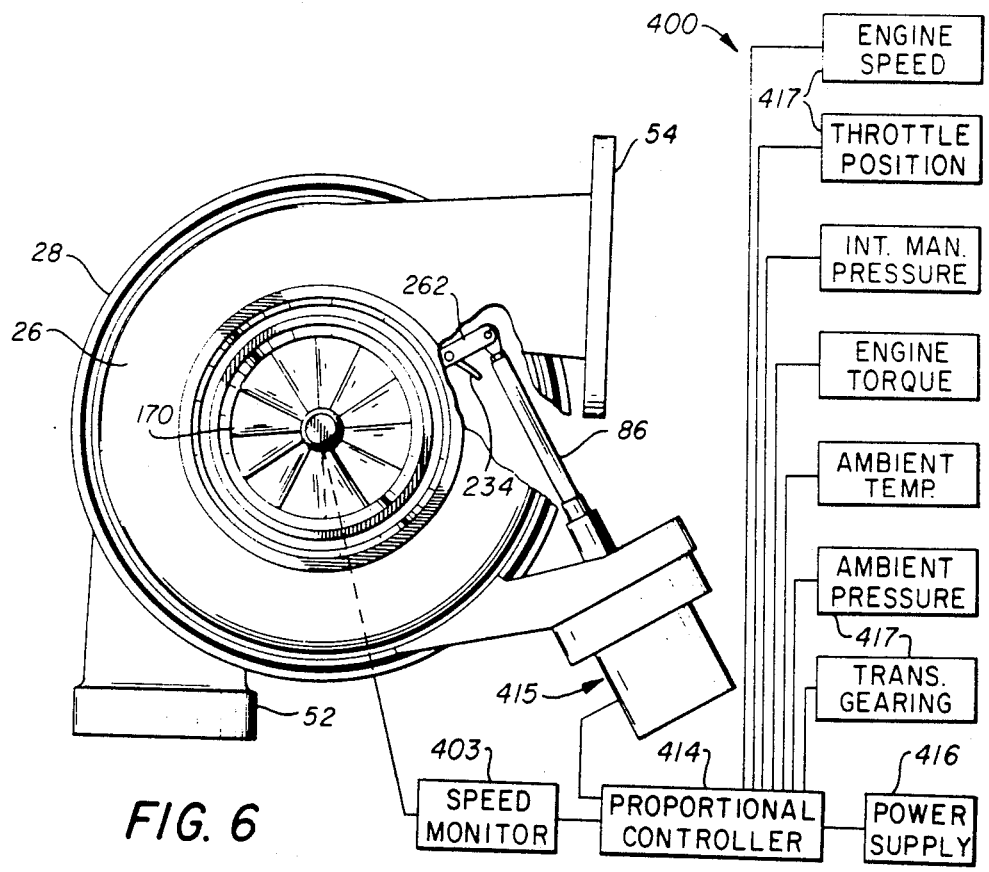
FIG. 6 is a partially broken away end view of the turbocharger of the present invention with an alternative method of controlling the turbine inlet vanes.
Figure 7:
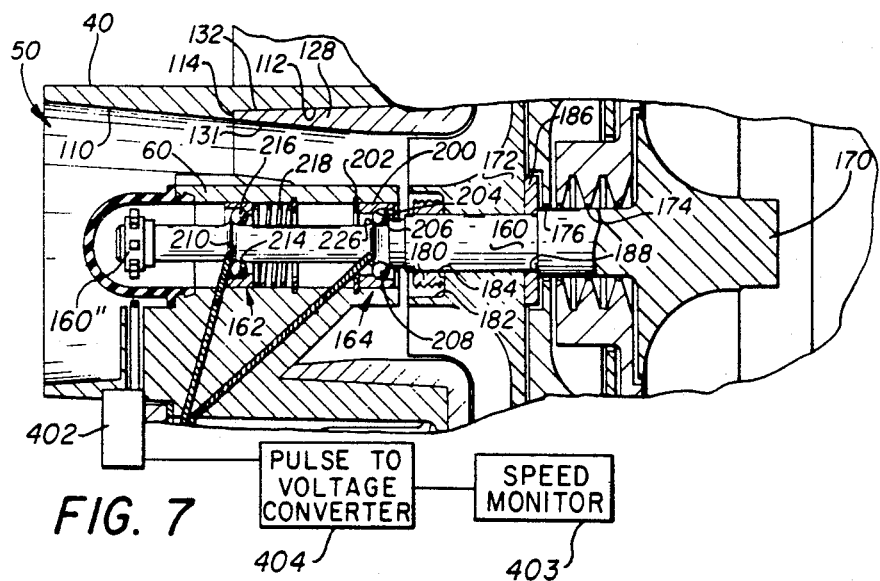
FIG. 7 is a vertical section taken along line 7—7 of FIG. 6.

The present invention accomplishes this result through the control of the variable turbine nozzles to maintain the turbocharger turbine and compressor speed at a level that produces the desired boost at all engine RPM levels. Referring to FIGS. 6 and 7, illustrating this embodiment of the present invention, a control unit 400 is substituted for actuator 80. Control unit 400 includes a magnetic sensor 402 (FIG. 7) connected to a monitor 403 by way of a pulse-to-voltage converter 404. The revolutions of shaft 160 are monitored by sensor 402 in cooperation with a disc 160" mounted on shaft 160. Disc 160" has a plurality of discontinuities thereon. The speed of shaft 160 is determined in the well known manner by converting the electrical pulse generated by the movement of the disc relative to magnetic sensor 402 and by inputting these pulses to pulse-to-voltage converter 404. In turn, this voltage, proportional to the rotational speed of disc 160" and shaft 160, is converted to shaft speed by monitor 403. Monitor 403 is connected by appropriate leads to a proportional controller 414. Controller 414 is connected to a power source 416 and to nozzle area controller unit 415. Unit 415 controls the movement of rod 86 to rotate lever extension 262 and vary the orientation of vanes 234 in the inlet area to turbine rotor 170.

In one embodiment of the invention, controller 414 is a microprocessor including a conversion system for receiving analog input from sensors 417 and speed monitor 403 for conversion to digital format usable by the microprocessor. The microprocessor may be of the general type now used in automobile ignition systems. Alternatively, a microprocessor which can be incorporated in the present system is microprocessor model 8080 manufactured by Intel. Proportional controller 414 also includes an amplification system for amplifying the signal provided from the microprocessor for controlling controller unit 415.

The microprocessor may be programmed to control the turbine speed, and thus the boost pressure provided by the turbocharger compressor, as a function of several parameters, for example, engine speed, throttle position, intake manifold pressure, engine torque, ambient temperature, ambient pressure or transmission gearing. As is shown in FIG. 6, sensors 417 are provided to meter each of these engine parameters and provide the corresponding analog reading to the proportional controller 414 where they are converted to the digital form for use by the microprocessor. Of course, the microprocessor may be programmed to position the turbine inlet nozzle to control compressor speed according to any direct or variable relationship of the parameters.

Referring now to FIG. 6a, the proportional controller 414 shown in FIG. 6 is illustrated in greater detail. A plurality of sensors 417a-g measure a parameter relevant to the operation of the automobile engine. Each of the sensors 417 plus the turbine speed monitor 403 produces an analog signal which is transmitted to respective analog to digital converters 424a-h. The signals produced by each of these sensors is transformed within the corresponding analog to digital converter into a series of digital words which represent the numerical value of the parameter being measured.

The digitized signals produced by the analog to digital converters 424 are conveyed to a microprocessor 426 which is included within proportional controller 414. Microprocessor 426 receives the digitized signals which represent the parameters being measured by sensors 417. The microprocessor evaluates the combination of signals received and produces therefrom a signal which corresponds to the optimum control position for the nozzle vanes 234. The output signal produced by microprocessor 426 is transferred to a digital to analog converter 428 which produces a corresponding nozzle control signal. The output of the digital to analog converter 428 is connected to a driver circuit 429 which amplifies the nozzle control signal. The amplified signal is transmitted to the nozzle area controller unit 415 for selectively positioning the nozzle vane 234. The driver circuit 429 not only provides amplification for the nozzle control signal, but also isolates the proportional controller 414 from the controller unit 415 as well as from any spurious signals generated in the region of proportional controller 414.

The proportional controller 414 and sensors 417 of the present invention utilize the technology which has previously been developed for automotive engine control directed to spark timing and fuel metering. Existing systems of this nature are described in an article by Gerald M. Walker, "Automotive Electronics Gets The Green Light," ELECTRONICS, Volume 50, No. 20, (Sept. 29, 1977), pages 83-92. Thus, with the present invention, the engine designer may provide a desired boost pressure corresponding to one or more of these or other parameters Of course, the parameters listed above are only indicative of some of the parameters which an engine designer may wish to use in choosing the optimum turbocharger compressor speed throughout the operation range of the engine and turbocharger.

The simplest arrangement is represented by merely maintaining the turbine speed, and thus the compressor speed, at a constant level throughout the operation of the engine. In this situation, a set point speed is selected for controller 414. Controller 414 provides a signal to actuator 418 in response to a comparison of the set point speed to the speed indicated from monitor 403. When the shaft speed monitored by monitor 403 is below the set point value of controller 414, controller 414 provides a signal to actuator 418 to retract rod 86 resulting in the rotation of vanes 234 and closing down of the turbine nozzles. As the turbine nozzles are closed down, the turbine speed is increased, increasing the rotation speed of shaft 160. When the shaft speed indicated by monitor 403 is greater than the set point value, the signal from controller 414 to actuator 418 causes the extension of rod 86 and the corresponding opening of the turbine nozzles resulting in a slowdown in the speed of the turbine and shaft 160 attached thereto. By continuing this operation, the speed of the turbine and compressor may be controlled in accordance with a predetermined set point value programmed into controller 414. Therefore, regardless of the engine speed and throttle position, a constant compressor and turbine speed may be maintained by varying the position of vanes 234 to control the flow velocity of exhaust gases against turbine rotor 170.

Using the arrangement of the present invention, a relatively high compressor speed may be maintained regardless of engine speed. This is accomplished by the capability of the present invention to vary the turbine nozzle area. Thus, upon engine acceleration, to "lag time" in boost pressure is experienced because there is no requirement that the compressor speed be increased from a relatively low speed to the higher values constantly maintained by the present turbocharger. Moreover, by maintaining high boost pressures at relatively low engine speeds, the present turbocharger provides improved engine performance at low engine rpm as well as at higher engine speeds.

The operation of the turbocharger as just described assumes that the turbocharger compressor is capable of operating through broad flow ranges as in the present invention. As will be described hereinafter, while some advantage would be provided to conventional turbochargers, the advantage provided by the variable area turbine nozzles of the present invention is greatly extended by its application to the present compressor which is capable of operating over a broad flow range. Thus, conventional turbochargers, plagued with a stall line prohibiting the operation of the compressor over a broad flow range, would not be benefited to the same degree as the present invention by the application of the variable area turbine nozzles.

Therefore, the present invention provides a turbocharger with the turbine nozzle area controlled by the movement of a single control ring rotating a plurality of actuator arms circumferentially spaced about the control ring. Moreover, the control ring and actuation levers are positioned in the unused air gap space existing between the turbocharger turbine and compression thereby making a very compact unit. Moreover, the particular location of the linkage further insulates the bearing assemblies from the heat to which the turbine and the surrounding area is subjected. In this way, the bearing assemblies may be oil starved or limitedly lubricated. This in turn eliminates the need for conventional lubrication by use of engine oil and the associated plumbing requirements required by such a lubrication method. This, of course, makes the turbocharger of the present invention less expensive to construct and operate as well as more reliable.

Moreover, the use in the present invention of ball bearing supports, and the corresponding elimination of thrust and disc type bearings, provides for a more controlled or "stiffer" turbine and compressor rotating assembly thereby allowing smaller clearances between both the turbine and the compressor and their surrounding structures. For example, in the present invention, the compressor blade height for a turbocharger for use with relatively small internal combustion engines could be on the order of 0.2 inches. The use of the ball bearing assemblies described above permits the design of the compressor with only a 0.005 inch clearance amounting to only 2.5 percent of the overall height of the blade. By contrast, were a journal and disc type bearing to be employed, a substantially greater clearance would be required (normally about 0.015 inch). As a result, the present invention is particularly adaptable to the construction of a turbocharger for smaller internal combustion engines where the smaller blade heights require closer clearances between the blades and the surrounding structure.

The use of ball bearings and their resultant lower frictional losses when compared to the journal and disc type bearings also makes possible for the first time the efficient use of a turbocharger which produces less turbine horsepower without losing a substantial portion of the turbine horsepower to bearing losses and friction. Where a journal and disc type bearing could account for a 4-5 horsepower loss in friction, the loss in friction by the present arrangement would be on the order of 0.1-0.4 horsepower.

Figure 8:
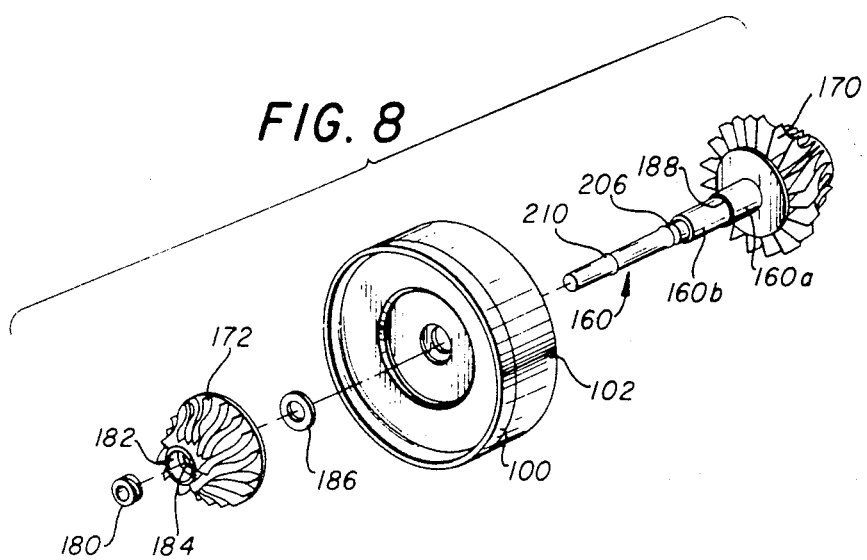
FIG. 8 is an exploded perspective view showing the turbine rotor, compressor-turbine shaft, the compressor and turbine backwalls, compressor bushing, compressor rotor and retaining sleeve.

FIG. 8 illustrates compressor rotor 172 and retainer nut 180 separated from turbine rotor 170 and compressor-turbine shaft 160. As is shown in FIG. 8, turbine rotor 170 is attached to one end of shaft 160, such as by welding or other suitable permanent attachment means. The shaft, prior to its attachment to turbine rotor 170, is formed with an enlarged bearing surface 160a, and a step 188 to a narrower diameter shaft portion 160b. As has been previously discussed, raceways 206 and 210 are formed directly in shaft 160.

In assembly, shaft 160 is inserted through apertures in compressor backwall 100 and turbine backwall 102. Shim 186 is positioned over shaft 160 into engagement with step 188 on shaft 160. Compressor rotor 172 is engaged over shaft 160 and rests on shaft portion 160b. Retainer nut 180 is then pressed onto portion 160b into bore 182 of compressor rotor 172 and into engagement with bottom wall 184 of bore 182. Nut 180 consists of a sleeve having a smooth inner bore 180a therethrough. The bore through nut 180 forms an interference fit with portion 160b of shaft 160. The interference, in one embodiment of the invention, is on the order of 0.001 of an inch.

Because the inner raceways are formed directly in the compressor-turbine shaft, the shaft must be heat treated to extremely high degrees of hardness. As a result, the present retaining sleeve secures compressor rotor 172 to shaft 160 without necessitating the grinding or cutting of threads into the hardened shaft. Thus, the cost and problems associated with forming threads on a heat treated shaft are eliminated. Further, because the shaft is substantially hardened, the retaining nut 180 may be pressed onto the shaft and withdrawn without damage to the shaft surface.

As also shown in FIG. 8, nut 180 is formed with threads around the outer facing surface thereof. Bore 182 is of a sufficient diameter as to provide a gap 420 (FIG. 9) between bore 182 and the threads on the outer surface of nut 180. This gap permits the insertion of an appropriate internally threaded tool for withdrawing the nut from the shaft for removal of the compressor rotor.

In some applications of the present invention, a spring device may be required between the retainer nut and the compressor rotor to maintain an axial force on the compressor rotor during expansion and contraction of components of the turbocharger. Unlike an internally threaded nut engaged on a threaded shaft, the retainer nut of the present invention does not have the capability of developing high compressive loading in the compressor rotor or tension in the compressor-turbine shaft when mounted in position. Therefore, in the alternative embodiment illustrated in FIG. 10, a cone shape or belville spring 422 is inserted between the retainer nut 180 and the compressor rotor 172.

Figure 10:
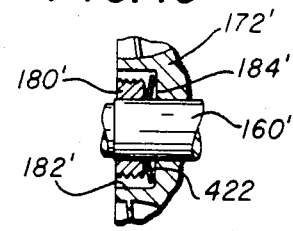
FIG. 10 is an alternative embodiment of the present invention showing the use of a spring member between the retaining sleeve and the compressor rotor.
Figure 9:
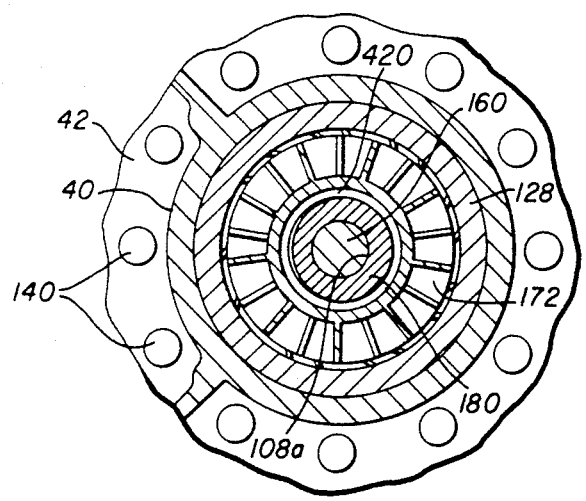
FIG. 9 is a section view taken along line 9—9 of FIG. 2.

Because the components in the embodiment illustrated in FIG. 10 are identical or correspond to elements in the embodiment illustrated in FIGS. 2 and 8-9, the same numeral, with the designation prime (') will be used to identify like or corresponding parts to those in the embodiment illustrated in FIGS. 2 and 8-9. Referring now to FIG. 10, shaft 160' is engaged through compressor rotor 172'. Retainer nut 180' is engaged over the end of shaft 160' with belville spring 422 mounted on shaft 160' between nut 180' and wall 184' of bore 182' in compressor rotor 172'. Belville spring 422 is initially compressed as retainer nut 180' is mounted on shaft 160'. The engagement of nut 180' against shaft 160' is sufficient to overcome any expansive forces developed between nut 180' and compressor rotor 172' by belville spring 422. Instead, the compression of spring 422 between rotor 172' and nut 180' induces an axial load in rotor 172'. Thus, with spring 422 in place, contractions or expansions in shaft 160' or compressor rotor 172' will not result in a zero engagement force between nut 180' and rotor 172'.

FIG. 11 illustrates compressor housing unit 24 and forward compressor wall insert 126 and their respective molds used in die-casting these two pieces. Heretofore, the compressor housing portion of many turbochargers have been sand-cast so that the circumferential chamber in which compressed air is directed for channeling to the intake manifold of the engine with which the turbocharger is used, could be formed with a substantially enclosed configuration having a narrow circumferential gap for receiving compressed air therein, thereby allowing the formation of a diffuser. Forming the compressor housing unit in one piece by sand-casting is substantially more expensive and produces a less accurate structure with much rougher wall surfaces in the circumferential chamber than a comparable die-cast unit. However, where the turbocharger compressor housing has been die-cast in the past, it has not been possible to produce the forward diffuser wall as is possible in a sand-casting because of the necessity of providing proper ingress and egress for the die-cast molds.

The present invention provides a two component die-cast compressor housing unit which upon assembly provides the advantages heretofore only afforded by a sand-cast unit. As is shown in FIG. 11, compressor housing unit 24 is formed by using an outer mold 290, an inner mold 292, a core mold 294 and a cap mold 296. Referring still to FIG. 11, mold 292 is formed with raised contour 298 to form circumferential chamber 44. Mold 292 also has a protrusion 300 for mating with a corresponding protrusion from mold 290 for forming inlet port 40, vanes 62 and bearing support cylinder 60. Core mold 294 and cap mold 296 are used to form compressor exhaust 52.

As can be seen in FIG. 11, molds 290, 292, 294 and 296 cooperate to make possible the die-casting of compressor housing unit 24. Molds 290 and 292 are constructed with abutting surfaces to form parting line 310 on housing unit 24.

Molds 320 and 322 cooperate to produce forward compressor wall insert 126. Molds 320 and 322 have abutting surfaces which engage one another to produce insert 126 with a parting line 324 on the outer edge of disc 130. As can best be seen in FIG. 11, throat 128 is formed with notches 326 which receive vanes 62 when insert 126 is mounted into housing unit 24.

FIG. 12, and section views 13, 14 and 15, illustrate the positioning and configuration of vanes 62. Referring to FIGS. 13, 14 and 15, each of the vanes 62 has a leading edge 330 and a trailing edge 332 with a thicker intermediate midsection 334. In each case, the thickest midsection is that indicated by a line 336 defining the parting line between molds 290 and 292 used in the formation of housing unit 24. Thus, vanes 62 may be formed by die-casting using molds 290 and 292 to produce the desired airfoil configuration of a leading and trailing edge separated by a thicker midsection therebetween. This configuration, shown in FIGS. 13, 14 and 15, greatly facilitates the ingress of air into the compressor inlet area, and in the configuration of the present invention, may be cast using well known die-casting techniques.

To accomplish an airfoil configuration for struts 62 such that the vanes taper from a thicker midsection to thinner leading and trailing edges, the die-cast molds must be inserted into inlet port 40 from both the forward and rearward ends. Thus, referring to FIG. 11, the second inside wall portion 112 (FIG. 2) is formed by protrusion 300 of mold 292 while first inside wall portion 110 (FIG. 2) is formed by mold 290. Both the first and second inside wall portions 110 and 112, respectively, diverge outwardly to permit removal of the die-cast mold after formation of the piece.

Thus, the formation of the desired geometry of struts 62 requires a diverging diameter wall portion 112 in inlet port 40 to permit a removal of the die-cast molds. However, it is critical to have a continuously converging diameter from the inlet of inlet port 40 to the compressor rotor 172. This is accomplished by use of wall insert 126. Wall insert 126 is formed, also by die-casting, with a diverging diameter outer surface 132 (FIG. 2) corresponding to the diverging surface of inside wall portion 112 of inlet port 40 for mating therewith. Inside wall surface 131 of throat 128 is formed with a diameter converging toward disc 130 corresponding to the extension of the converging diameter of first inside wall portion 110 of inlet port 40. Thus, when insert 126 is mated with inlet port 40, a continuous converging diameter is provided from the inlet of port 40 inwardly to compressor rotor 172 (FIG. 2).

Thus, the present invention provides a two-piece structure for forming the compressor housing for a turbocharger, both of which may be die-cast. Upon assembly, these two components produce a compressor housing having a plurality of struts 62 supporting a bearing support cylinder 60 with the vanes having a thicker intermediate section converging to a thinner leading edge and to a thinner trailing edge. The housing further provides a continuously converging inlet nozzle from the inlet of the inlet port to the compressor rotor. Further, the compressor housing provides a forward diffuser wall for completing the circumferential chamber in which compressed gases are channeled to the compressor exhaust.

FIG. 16 shows an adaptation of the invention illustrated in FIG. 2 wherein differing geometries of wall inserts 126 may be substituted one for the other for use with corresponding compressor rotors. Referring to FIG. 16, wall insert 126a provides a more restrictive air flow into the turbocharger while wall insert 126b provides for a larger compressor rotor and greater air flow into the turbocharger. It will be now appreciated that modification of the design of the present invention may be accomplished by merely fitting differing wall inserts 126 to a standard compressor housing unit 24. Thus, several different turbochargers, having different flow capabilities, may be produced from the present invention using a standard compressor housing unit 24 by selecting one of any number of possible geometries for wall insert 126 with corresponding compressor wheels. This feature is significant in that wall insert 126 is the simpler component of the compressor housing unit.

In prior art turbocharger units, either of the die-cast or sand-cast variety, any modifications would involve producing a totally new casting for each new design. In the present invention, a different air flow/pressure ratio compressor design is achieved by simply substituting a wall insert of a different design in conjunction with a new or modified compressor wheel.

Therefore, the present invention provides a turbocharger compressor housing unit which may be die-cast. The compressor rotor housing unit includes a compressor housing and forward wall insert for engagement with the housing. This two component construction permits each of the two components to be die-cast using standard die-casting techniques. In their combined configuration, a compressor housing is produced having a circumferential chamber closed on all sides except for a circumferential gap for receiving compressed gases from the compressor rotor. A circumferential passageway is also provided leading to this gap to the chamber wherein accelerated gases are diffused to increase static pressure.

Moreover, a compressor bearing support cylinder is cast concentric with the inlet port and supported therein by a plurality of vanes extending from the inner wall of the inlet port. The vanes are formed with a leading and trailing edge separated by a thicker midsection. This is accomplished through the use of molds having a parting line substantially at the thicker cross sectional area to permit die-casting of the compressor housing.

While the present invention of die-casting a compressor housing unit in two components has been applied to a turbocharger wherein the compressor rotor and turbine rotor are overhung to one side of and supported from a shaft rotatable on ball bearing assemblies, it will be apparent to one skilled in the art that the present invention may readily be adapted to turbochargers of the conventional design having the compressor rotor and turbine rotor supported on opposite sides of shaft bearing support assemblies. In this particular application, the heretofore described compressor housing unit would be directly usable with only modification of the bearing support cylinder.

Figure 18:
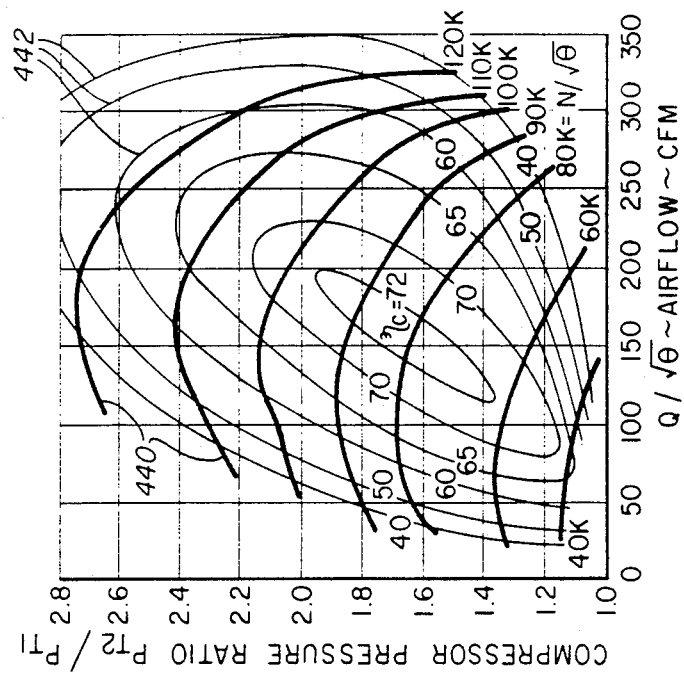
FIG. 18 illustrates a compressor performance map for the turbocharger illustrated in FIGS. 1-16.
Figure 17:
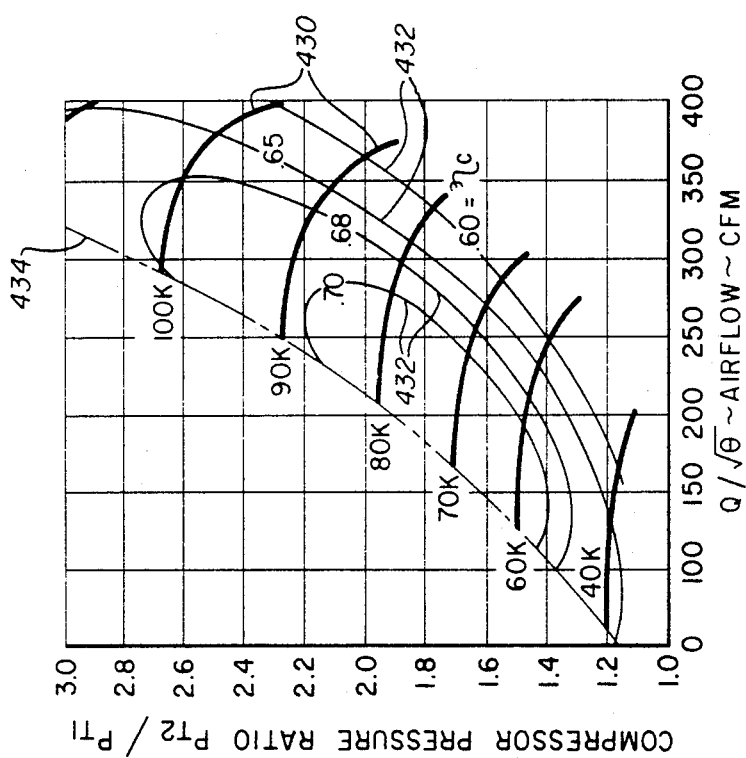
FIG. 17 illustrates a compressor performance map for a conventional turbocharger.

A critical feature of the present turbocharger is its capability of performing over an extremely wide range of compressor speeds and flows without experiencing a "surge line" commonly encountered in conventional turbochargers. This highly significant feature is demonstrated by reference to the performance graphs, known as "compressor maps", illustrated in FIGS. 17 and 18. FIG. 17 illustrates a typical compressor map for a conventional turbocharger, while FIG. 18 illustrates a compressor map for the turbocharger of the present invention. These maps plot air flow in cubic feet per minute versus the ratio of discharge pressure to inlet pressure for the turbocharger compressor.

Referring to FIG. 17, constant compressor speed lines 430 and isentropic efficiency lines 432 are shown. A surge line 434 identifies the performance points to the left of which the turbocharger compressor cannot operate to produce a uniform output of air. While the components of the turbocharger may be modified such that the surge line is shifted toward the vertical axis to provide for stable operation at lower turbocharger speeds, and thus lower engine speeds, such a shifting of the operating characteristics of the turbocharger reduces the high speed capabilities of the unit. Therefore, turbochargers have heretofore been relegated to providing increased performance at only higher engine speeds.

The present invention provides a turbocharger capable of producing a uniform output at very low turbocharger air flows and effectively eliminates the surge line limitation encountered in conventional turbochargers. Referring to FIG. 18, compressor performance map for the turbocharger of the present invention is illustrated including constant compressor speed lines 440 and efficiency lines 442.

As can be appreciated by viewing the compressor map illustrated in FIG. 18, the compressor of the present turbocharger continues to operate with no irregularity in compressor output to very low air flow values. Effectively, the turbocharger of the present invention does not experience a "surge line" corresponding to that illustrated in the compressor map of FIG. 17.

Referring to FIGS. 17 and 18, the breadth of the operating range of the conventional turbocharger may be compared with that of the present invention. Referring specifically to FIG. 17, at a compressor pressure ratio of 1.9, the air flow range varies from a high of 350 at an efficiency of 60% to a low of 200 cubic feet per minute at the surge line. Therefore, this ratio of high to low flow rate (350 divided by 200) is 1.75. Referring to FIG. 18, at a pressure ratio of 1.9, the present turbocharger operates from a flow rate of 275 at a 60% efficiency to a low of 60 cubic feet per minute without encountering a surge line. The ratio of the high to low flow rate (275 divided by 60) is 4.58, an increase of over two and one-half that of the conventional turbocharger.

This achievement is highly significant in that the turbocharger can be effectively used to improve performance both at lower engine speeds as well as at higher engine speeds. This development becomes even more significant when coupled with the feature of the present invention for providing a constant compressor speed for varying engine speeds or constant boost at varying engine speeds in that a higher desired pressure ratio may be attained at low engine rpm's without surge or turbulence problems normally experienced at the lower compressor flows in conventional turbochargers.

This significant advancement provided by the turbocharger of the present invention is primarily attributable to the compressor air inlet configuration in conjunction with advanced radial flow compressor technology—such as backward swept blading. As has been described, bearing support cylinder 60 is supported within tubular inlet port 40 by a plurality of struts 62 extending from the inside wall of inlet port 40 to the bearing support cylinder 60. In one embodiment, three struts extend from the inside wall of the inlet port to the bearing support cylinder to position the cylinder concentrically within the compressor air inlet. As a result, the inlet is divided into more than one inlet channel. Additionally, these channels are proportionately long in the flow direction compared to any width dimension. Further, the struts have a contour including a leading and trailing edge narrower than an intermediate section of the strut. As is also shown in FIG. 2, the inside wall portion of inlet port 40 has a converging diameter from the inlet end to the area adjacent compressor rotor 172.

This structure stabilizes the back flow conditions normally encountered at low compressor flows.. By stabilizing the back flow conditions, the compressor is able to continue to function to provide a steady state flow of air at much lower compressor flows than heretofore possible in conventional turbochargers.

Figure 19:
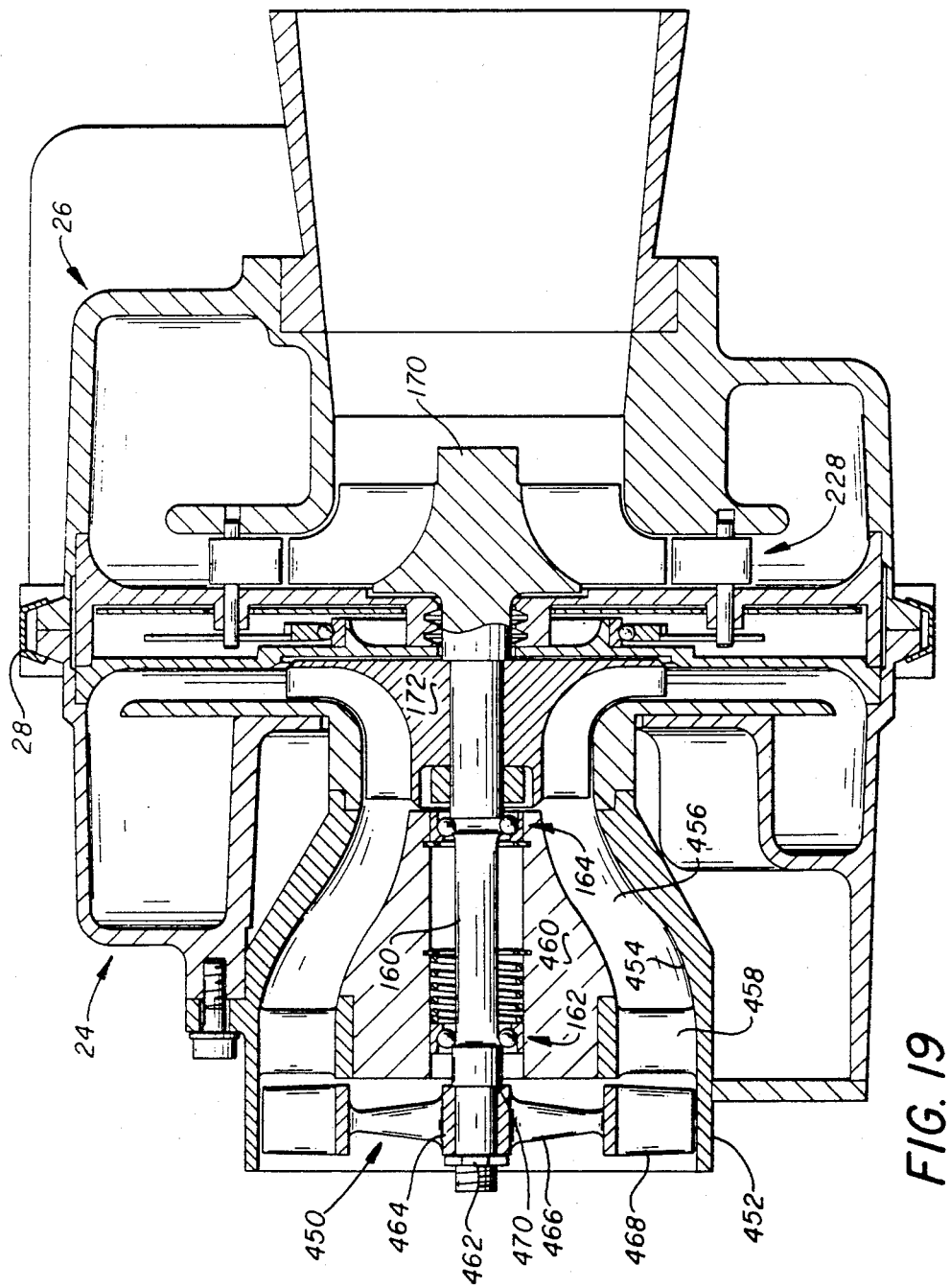
FIG. 19 illustrates a vertical section of an alternative embodiment of the turbocharger of FIGS. 1-16.

FIG. 19 illustrates a vertical section of an alternative embodiment of the turbocharger illustrated in FIGS. 1–16. The turbocharger of FIG. 19 is identical to the turbocharger illustrated in FIGS. 1–16 with the exception that an axial stage compressor rotor 450 is mounted in the compressor inlet port. Because of the substantial identity between many components in the alternative embodiment illustrated in FIG. 19 and the turbocharger illustrated in FIGS. 1–16, like or corresponding parts are identified by the same numeral.

In the embodiment of FIG. 19, the compressor inlet port is modified to include a larger diameter inlet port 452 having an inner wall 454 defining the inlet channels 456 to radial compressor rotor 172. A plurality of stators 458 extend from inner wall 454 of inlet port 452 to support bearing support 460. An axial stage compressor rotor 450 is mounted on the end of shaft 160 on the side of bearing assemblies 162 and 164 opposite compressor rotor 172 and is retained in position by an appropriate nut 462. The compressor rotor includes a hub 464 and a plurality of struts 466 attached between hub 464 and struts 468. Hub 464 engages a step 470 on shaft 160 and is positioned between step 470 and nut 462.

As can be appreciated from viewing FIG. 19, air entering inlet port 452 is compressed by the axial stage compressor and is carried through channels 456 to radial compressor rotor 172. The use of a two-stage compressor is significant in that a broader operating range may be accomplished with the use of a two-stage compressor as compared to the range possible from a single stage compressor. For example, in use of a two-stage compressor, the first stage may be used to achieve a pressure ratio of inlet pressure to discharge pressure of 1.5 to 1.6 while the second stage may be used to achieve a pressure ratio of 3.0 to 3.5. These combined pressure ratios effectively produce a pressure ratio on the order of 4.5 to 5.6. While such pressure ratios may be achieved in a single stage, the higher compressor speed required to produce such pressure ratios would dictate the use of higher quality and more expensive compressor and turbine components as well as producing significant flow range restraints. In the present arrangement, the two-stage unit accomplishes the higher pressure ratios without this additional expense or disadvantage. Moreover, in the present invention, the axial stage compressor is mounted on the opposite side of the bearing support structure from the radial compressor and turbine rotors thereby providing balance to the system and no particular ill effects.

Figure 20:
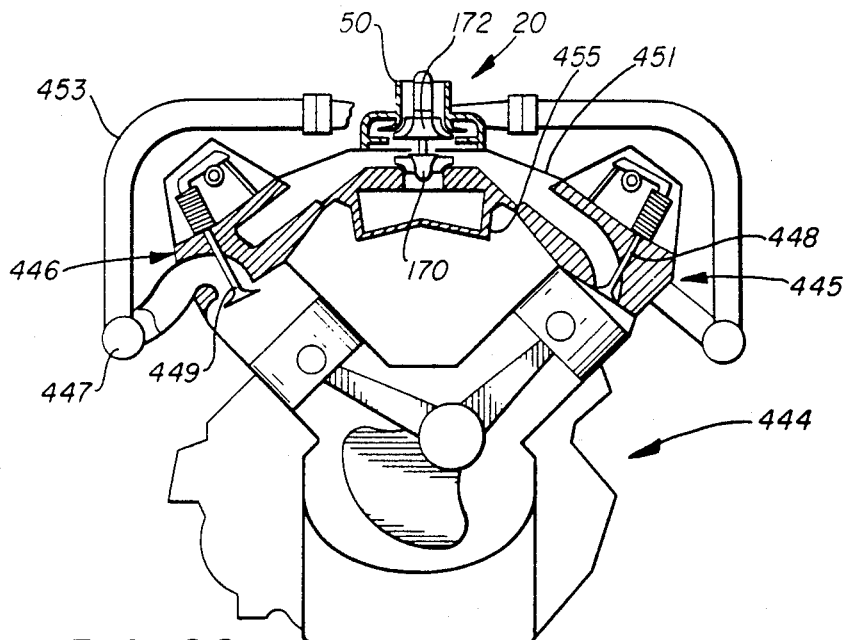
FIG. 20 illustrates a vertical section of the turbocharger illustrated in FIGS. 1-16 mounted on a "V" engine.
Figure 21:
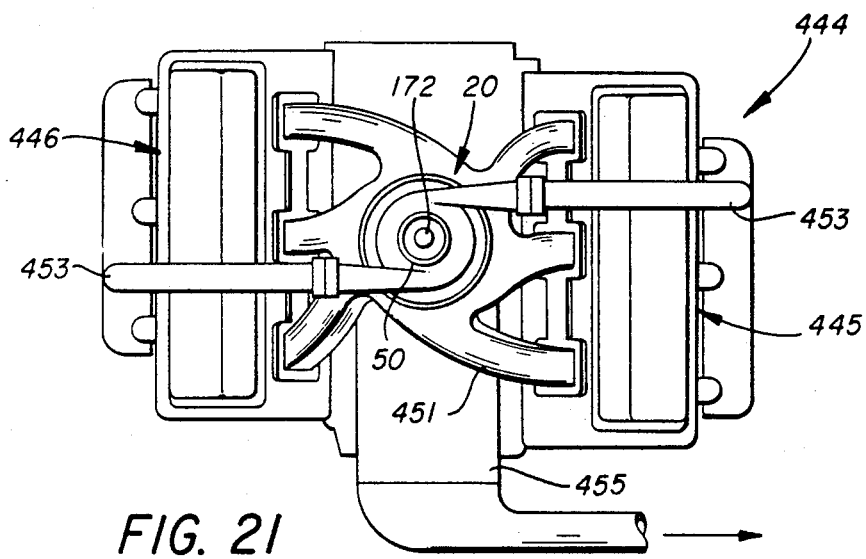
FIG. 21 is a top plan view of the assembly illustrated in FIG. 20.

FIGS. 20–23 illustrate a novel way of mounting the turbocharger illustrated in FIGS. 1–16 on an internal combustion engine. FIGS. 20 and 21 illustrate a vertical section view and top plan view, respectively, of turbocharger 20 mounted on a V-6 engine 444. Of course, it will be understood that this same application can be made on a "V" engine of any number of cylinders. Engine 444 represents a conventional V-arrangement engine having a right cylinder bank 445 and a left cylinder bank 446. The section shown in FIG. 20 illustrates a section through an exhaust valve 448 in the right cylinder bank 445 and through an intake valve 449 on the left cylinder bank 446. Turbocharger 20 is mounted with the turbine and compressor rotational axis in a vertical position, an orientation not heretofore possible for conventional turbochargers. Because of the provisions in the present turbocharger for providing oil to the bearing assemblies by way of wicks and the corresponding construction which eliminates the need for a continuous flow of lubricant to the bearings, the present invention may be oriented with the compressor and turbine rotational axis in a true vertical orientation or any angle between vertical and horizontal. By contrast, conventional turbochargers, normally requiring a flow of lubricant to and from the bearing structures, have not been successful in operating in a true vertical orientation as illustrated in the arrangement of FIGS. 20 and 21.

Referring still to FIGS. 20 and 21, engine exhaust is channeled to turbocharger 20 by way of manifold 451 wherein exhaust gases are communicated directly to turbine rotor 170 of turbocharger 20 from each individual exhaust valve. Turbocharger compressor exhaust is fed into the cylinders of engine 444 through manifolds 447 by way of cross over tubes 453 to intake valves 449.

In operation, air is drawn into turbocharger 20 at inlet 50, is compressed by compressor motor 172, and discharged through tubes 453 to manifolds 447 into the cylinders on both the left and right banks of the engine. Exhaust gas from the engine is delivered by way of manifold 451 to turbine rotor 170 at spaced points therearound and thereafter discharged through exhaust duct 455. This spacing allows the turbine to utilize the high energy pulses created when the exhaust valve first opens.

As can be appreciated from viewing FIGS. 20 and 21, the turbine rotor is mounted in a turbine housing having a circumferential chamber with the variable nozzles therein aligned substantially in a plane perpendicular to the axis of rotation of the turbine rotor. Further, the engine exhaust ports are aligned in a common plane oriented horizontally. As can be seen the normal turbine housing commonly used is replaced by manifold 451 which serves as both exhaust manifold and turbine housing. The ability to use the present invention in a vertical orientation makes possible the alignment of the plane of the exhaust ports substantially parallel to the plane of the circumferential chamber of the turbine housing by positioning the turbine shaft axis substantially perpendicular to the plane of the exhaust ports. In this way, the exhaust gases from the exhaust ports may be more directly and effectively injected to the turbine housing for driving the turbine rotor.

In contrast, prior turbocharger units have required the use of manifolds having extremely complicated designs for directing exhaust gases from the exhaust ports to the turbine rotor. Further, in the present invention, the exhaust manifold directs exhaust gases from each of the exhaust ports from the engine to points substantially equally spaced around the turbine rotor, thus communicating exhaust gases to different points about the circumference of the turbine rotor. In this way, the cyclic exhaust pulses from the engine exhaust ports are distributed about the circumference of the turbine rotor to take advantage of these pulses. The vertical orientation of the present turbocharger also makes possible the nesting of the turbocharger between the banks of the cylinders in close proximity to the engine. Further, the exhaust gases may be ported by way of exhaust manifold directly from the cylinders to the turbocharger turbine with very little loss of energy prior to application of the exhaust gases to drive the turbine.

It will be understood that a carburetor may be mounted directly above the turbocharger to feed a fuel air mixture into inlet 50. Likewise, the turbocharger may be used on a fuel injection or diesel engine where fuel is fed directly into the engine cylinders.

Figure 22:
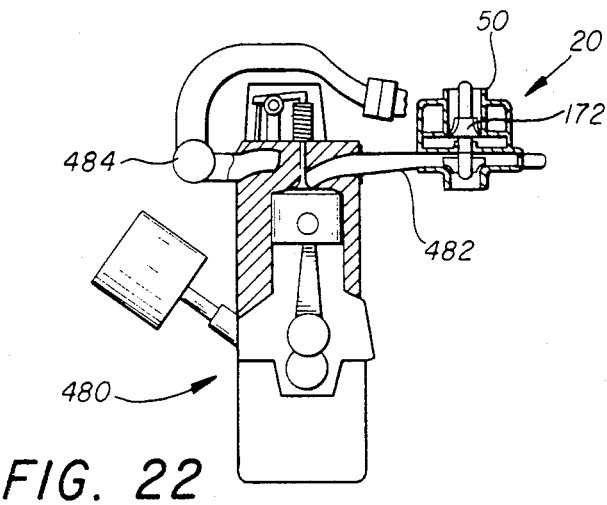
FIG. 22 illustrates a vertical section of the turbocharger of FIGS. 1-16 mounted on an in-line engine.
Figure 23:
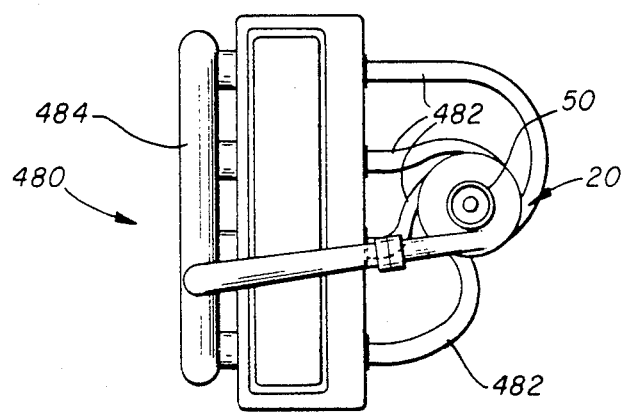
FIG. 23 is a top plan view of the assembly illustrated in FIG. 22.

Referring now to FIGS. 22 and 23, the turbocharger of the present invention mounted in a vertical position is shown in use on an in-line four cylinder engine. Of course, it will be understood that the invention also envisions the use of the present turbocharger on an inline engine of more or less than four cylinders. In the embodiment illustrated in FIGS. 22 and 23, turbocharger 20 is connected to engine 480 by way of an exhaust manifold 482 communicating between the exhaust valves of the engine cylinders to the turbocharger turbine. Air is drawn into the turbocharger at inlet 50, compressed by turbocharger compressor rotor 172 and discharged through manifold 484 into the intake valves of the engine cylinders. As can be seen in FIG. 23, exhaust manifold 482 is formed such that the gases driving the turbocharger turbine are communicated to the turbine at spaced points about the turbine circumference. Further, the manifold is oriented to facilitate rotation of the turbine in a clockwise direction as viewed from FIG. 23. Similarly, as can be seen from FIG. 21, a similar manifold arrangement is provided when the turbocharger is mounted intermediate of two banks of cylinders in a V-arrangement engine.

Therefore, the present invention provides a turbocharger which can be oriented with the axis of rotation of the turbine and compressor vertical or at any position intermediate of horizontal and vertical. This is made possible largely because of the provisions in the present invention for lubricating the bearing structures on which the compressor and turbine shaft rotate. Because the present invention may be so oriented, it is ideally suited for mounting to and use with conventional engines of all types and arrangements.

The present turbocharger configuration described with respect to FIGS. 1-16 may be readily converted into an effective turbojet or turbofan engine as illustrated in FIGS. 24-28. While these embodiments are illustrated by a vertical section of only the upper half of apparatus, it will be understood that the lower half of the unit is substantially identical to the upper half shown.

Figure 24:
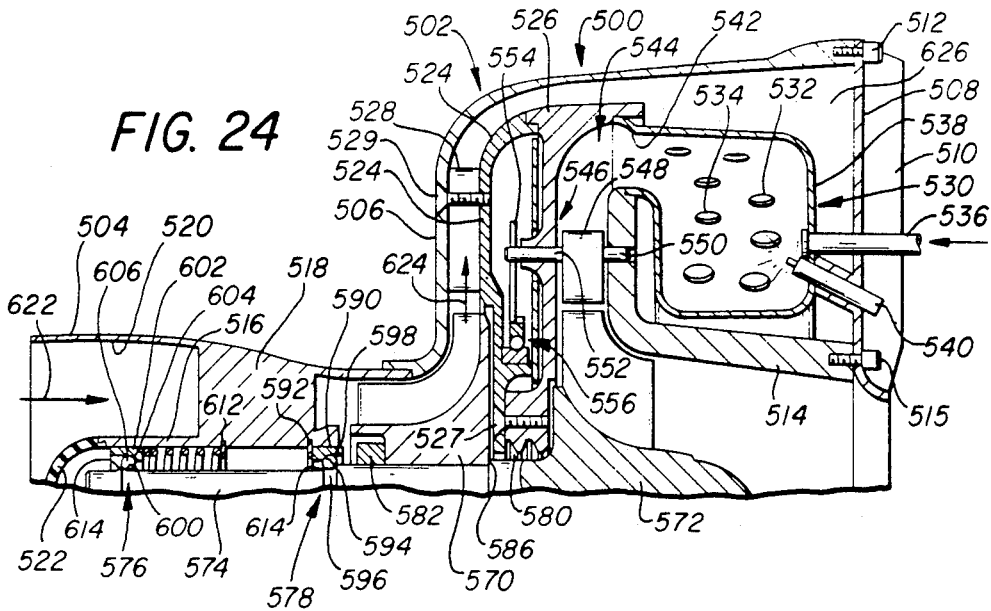
FIG. 24 illustrates a vertical section of the upper half of a turbojet in accordance with the present invention.

A turbojet 500 embodying the present invention is illustrated in FIG. 24. Turbojet 500 includes an outer housing 502 consisting of a tubular inlet nozzle 504, main housing 506 and combustion chamber backwall plate 508. Backwall plate 508 includes an integral stiffener 510 and is attached to main housing 506 by bolts 512. A turbine exhaust nozzle 514 is supported within main housing 506 by attachment to the end of backwall plate 508 opposite main housing 506 by bolts 515.

A bearing support cylinder 516 is mounted within tubular inlet nozzle 504 by a plurality of struts 518 extending from the inside wall surface 520 of inlet nozzle 504. This arrangement is similar to that illustrated in FIGS. 1-16 with respect to the bearing support cylinder 60 and its attachment within inlet port 40 of turbocharger 20. A cap 522 is mounted over the end of bearing support cylinder 516. Referring still to FIG. 24, a compressor backwall 524 and turbine back wall 526 are positioned within main housing 506 and are attached one to the other by suitable screws 527. In the embodiment illustrated in FIG. 24, a fixed stator vane 528 is mounted between main housing 506 and compressor backwall 524 by suitable screws 529. A combustion liner 530 is mounted between turbine backwall 526 and a transversely extending portion of turbine exhaust nozzle 514. Combustion liner 530 may be of a conventional design including a circumferential chamber having a plurality of ports formed therein. The liner includes ports 532 for primary air combustion and ports 534 for dilution air according to known practice. Fuel is supplied to the combustion chamber by fuel spray nozzles 536 extending through combustion chamber backwall plate 508 and upstream wall 538 of the combustion liner. An ignitor 540 is received within combustion liner 530 through upstream wall 538 and combustion chamber backwall plate 508. Combustion liner 530 has a mouth 542 leading to a turbine inlet area 544 formed between turbine backwall 526 and the transversely extending portion of turbine exhaust nozzle 514.

A turbine inlet area control structure 546 is used in turbojet 500 illustrated in FIG. 24 and is identical to turbine inlet area control structure 228 illustrated and described with respect to the turbocharger of FIGS. 1-16. More specifically, turbine inlet area control structure 546 includes movable nozzle vanes 548 positioned circumferentially about the nozzle area and rotatable to vary velocity and angle of flow of combustion gas through nozzle inlet 544. Vanes 548 include trunnions 550 and 552 extending from opposite sides thereof. Trunnion 550 extends through the transversely extending portion of turbine exhaust nozzle 514, and trunnion 552 extends through turbine backwall 526 and is attached to an actuation lever 554. The end of actuation lever 554 is engaged with the outer race of a ball bearing assembly 556, with the inner race of the ball bearing assembly being secured to compressor backwall 524 as discussed with respect to turbocharger 20 illustrated in FIGS. 1-16. Likewise, the operation of actuation lever 554 is identical to that discussed with respect to turbocharger 20 of FIGS. 1-16 to control the angular orientation of nozzle vanes 548 as desired.

Bearing support cylinder 516 is supported concentrically within inlet nozzle 504, as previously described, by struts 518. A compressor rotor 570 and a turbine rotor 572 are supported on a shaft 574 mounted for rotation in bearing support cylinder 516 by two ball bearing assemblies 576 and 578. Turbine rotor 572 is mounted at one end of shaft 574 and radial flow compressor rotor 570 is mounted intermediate of turbine rotor 572 and bearing assemblies 576 and 578. Shaft 574 passes through turbine backwall 526 and through compressor backwall 524 wherein a labyrinth seal 580 formed around shaft 574 provides a seal between the compressor and turbine rotors.

Turbine rotors 572 is fixedly attached to shaft 574, such as by welding, and compressor rotor 570 is retained in position on shaft 574 by a retainer nut 582. Nut 582 is of the same arrangement as nut 180 described with respect to the embodiments illustrated in FIGS. 1-16. Compressor rotor 570 is positioned between nut 582 and a step 586 in shaft 574.

Referring still to FIG. 24, a bearing ring 590 is fitted within the end of cylinder 516 adjacent compressor rotor 570 and is prevented from moving within cylinder 516 by a retaining ring 592 attached to cylinder 516. Outer raceway 594 of bearing assembly 578 is formed in ring 590, the inner raceway 596 being formed integrally in shaft 574. Balls 598 are received between inner and outer raceways to form bearing assembly 578.

A bearing support cylinder 516 is mounted within inlet nozzle 504 by a plurality of struts 518 extending from the inside wall surface 520 of inlet nozzle 504. This arrangement is similar to that illustrated in FIGS. 1-16 with respect to bearing support cylinder 60 and its attachment within inlet port 40 of turbocharger 20. A cap 522 is mounted over the end of bearing support cylinder 516.

Referring still to FIG. 24, a compressor backwall 524 and turbine backwall 526 are positioned within compressor-burner housing 506 and are attached one to the other by screws 527.

Bearing assembly 576 includes inner raceway 600 formed integrally in shaft 574 and an outer ring 602 slidable within cylinder 516 with an outer raceway 604 formed therein for receiving balls 606. A compression spring 610 is engaged between ring 602 and a retaining ring 612 fixed within cylinder 516 and biases ring 602 outwardly to fix the position of balls 606 and 598 in bearing assemblies 576 and 578, respectively, thereby fixing the position of shaft 574.

The structure of the bearing assemblies for the turbojet 500 is identical to that arrangement used for turbocharger 20 illustrated in FIGS. 1-16.

Therefore, the assembly and operation of the bearing assemblies is identical to that described earlier with respect to turbocharger 20. Likewise, the means of lubricating the bearing assemblies, wicks in contact with inclined ramps 614, is identical to that illustrated with respect to turbocharger 20 illustrated and described in FIGS. 1-16.

In operation of the turbojet illustrated in FIG. 24, air enters tubular air inlet port at its inlet 620 following the air path indicated by arrow 622. This air is compressed by compressor rotor 570 and is discharged radially therefrom along the air path indicated by arrow 624. This compressed air is delivered into a combustion chamber area 626 and into combustion liner 530 through ports 532 and 534. Air is mixed with fuel, injected into combustion liner 530 through nozzles 536. A stochiometric mixture is obtained and the mixture is ignited within combustion liner 530 by ignitors 540. Cooling air is delivered into combustion liner 530 through ports 534 to cool the exhaust gases from combustion prior to their entry into turbine inlet area 544. These gases engage turbine rotor 572 to drive the rotor and the compressor rotor attached thereto by way of shaft 574. The combustion gases are thereafter discharged through nozzle 514 to the outer atmosphere, producing the thrust provided by the turbojet.

As can be appreciated by review of the turbojet illustrated in FIG. 24, the system is compact in size and has a minimum of components. Further, the bearing assemblies on which the turbine and compressor rotor shaft rotate are positioned away from turbine rotor 572 and the extremely hot combustion gases delivered thereto from combustion liner 530.

Moreover, the serious problems encountered as a result of the extremely high temperatures such bearing structures are normally subjected to are completely eliminated by the unique bearing arrangement disclosed in the present invention. Because the bearings are removed from the extremely high temperatures associated with the combustion gases used to drive the turbine and indeed even insulated from these high temperatures by the compressor rotor and compressor backwall and turbine backwall, limited lubrication is sufficient for the successful operation of the unit. This eliminates the need for a constant flow of lubrication to the bearings as well as the numerous components necessary to provide such lubrication that would have to be driven by the rotating shaft.

Figure 25:
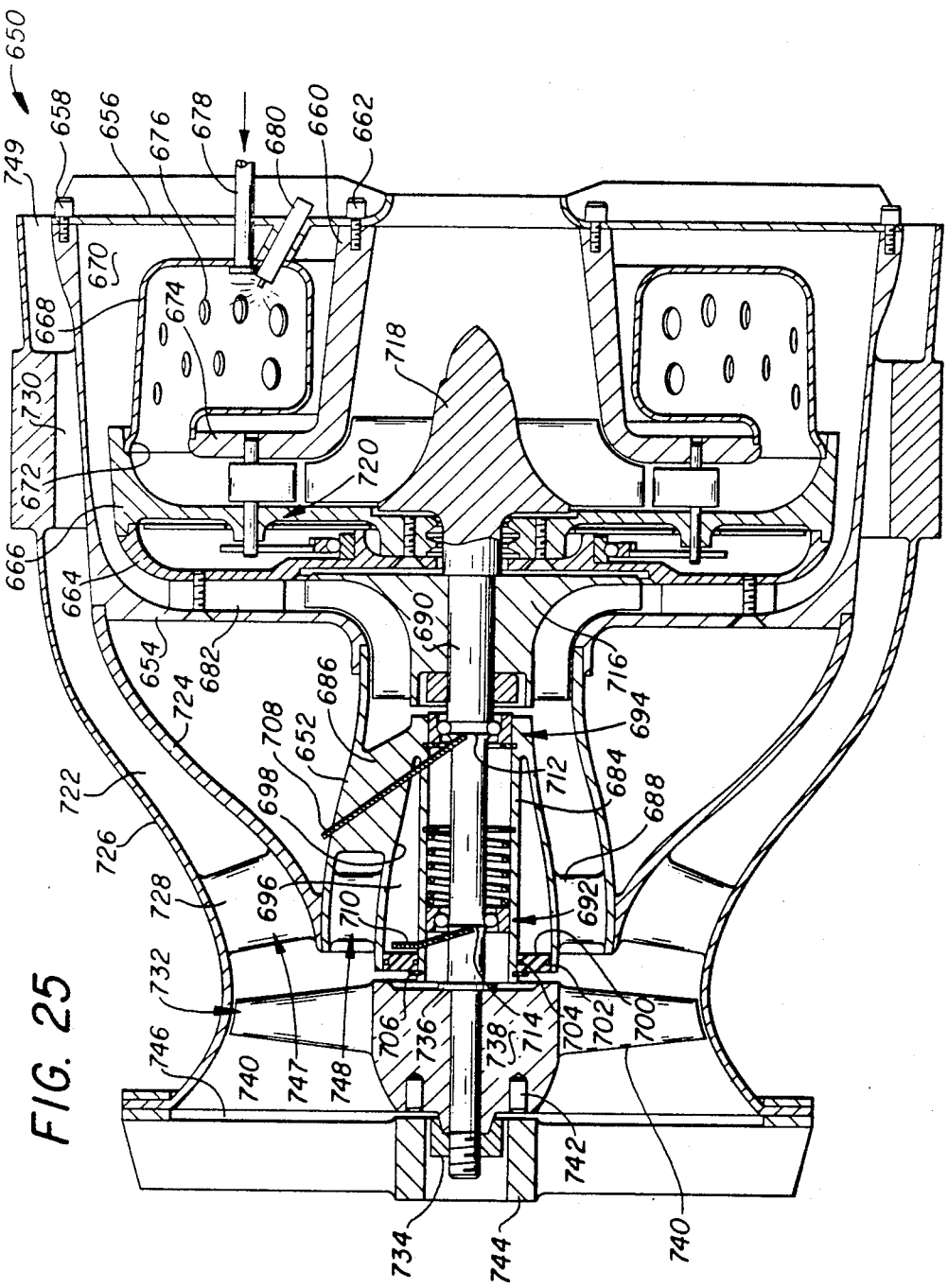
FIG. 25 illustrates a vertical section of a turbofan in accordance with the present invention.

FIG. 25 illustrates a turbofan 650. The structure of turbofan 650 is substantially identical to the structure of turbojet 500 illustrated in FIG. 24 with the exception that a bypass air channel is provided in addition to the primary air channel and an axial stage compressor is provided upstream of the radial compressor.

Referring to FIG. 25, turbofan 650 includes an inlet nozzle 652, a main housing 654 and a combustion chamber backwall 656. Combustion chamber backwall 656 is attached to main housing 654 by appropriate bolts 658. A turbine exhaust nozzle 660 is attached by bolts 662 to combustion backwall 656. A compressor backwall 664 and a turbine backwall 666 are positioned within main housing 654, and a combustion liner 668 is mounted within a combustion chamber 670 with a mouth 672 opening between turbine backwall 666 and a laterally extending portion 674 of turbine exhaust nozzle 660. Combustion liner 668 is formed with a plurality of ports 676. A fuel injection unit 678 is received through combustion backwall 656 into liner 668. An ignitor 680 is also received within liner 668 for igniting fuel air mixtures in operation of the turbofan.

A stator vane 682 is mounted between main housing 654 and compressor backwall 664 by suitable screws. A bearing support cylinder 684 is mounted within inlet nozzle 652 by a plurality of struts 686. A plurality of stator vanes 688 are also mounted in the inlet nozzle 652 for cooperation with the axial stage compressor as will be discussed hereinafter in greater detail.

Shaft 690 is supportd within bearing support cylinder 684 by bearing assemblies 692 and 694. Bearing assemblies 692 and 694 are identical to those described with respect to turbojet of FIG. 24 and the turbocharger illustrated in FIGS. 1-16, and reference is hereby made to the earlier description thereof. An oil chamber 696 is formed between inner wall 698 of inlet nozzle 652 and bearing support cylinder 684. An appropriate ring 700 with O-rings 702 and 704 are positioned in the mouth of chamber 696 and retained in position by ring 706. Wicks 708 and 710 communicate through oil chamber 696 to provide oil to inclined ramps 712 and 714, respectively, thereby providing lubrication to bearing assemblies 692 and 694 as described earlier with respect to the embodiments of FIGS. 1-16 and FIG. 24.

A radial compressor rotor 716 and turbine rotor 718 are mounted on shaft 690 and a turbine inlet control structure 720, identical to that discussed with respect to the embodiments of FIGS. 1-16 and FIG. 24, is incorporated to control the velocity and angle of combustion gases to turbine rotor 718.

A bypass flow channel 722 is formed between an inner bypass wall 724 and outer bypass wall 726. Outer bypass wall 726 is attached to inner bypass wall 724 by a plurality of stator vanes 728 positioned therebetween. Outer bypass wall 726 is positioned from main housing 654 by a plurality of struts 730 spaced circumferentially around housing 654.

An axial stage compressor rotor 732 is attached to shaft 690 by an appropriate nut 734 engaging rotor 732 against a retaining ring 736. Rotor 732 includes a hub 738 and a plurality of vanes 740 extending radially therefrom. A plurality of cylindrical armatures 742 are embedded within hub 738 of rotor 732 and cooperate with a stationary field winding 744 mounted adjacent thereto from outer bypass wall 726 by struts 746 to produce electric current.

The operation of the turbofan illustrated in FIG. 25 is substantially similar to that of the turbojet illustrated in FIG. 24 with the exception that air entering the inlet of the turbofan at axial stage compressor rotor 732 is divided into a bypass flow indicated by arrow 747 and a primary flow indicated by arrow 748. Bypass air is compressed and discharged through a bypass nozzle 749 producing thrust from the turbofan. Primary air is directed along the path indicated by arrow 748 and is compressed by axial stage compressor rotor 732 and radial compressor rotor 716 prior to being mixed with fuel in combustion liner 668 and ignited therein. The ignited gases move past the turbine inlet area control structure and against turbine rotor 718 to drive the turbine rotor, as well as the axial stage compressor rotor 732 and radial compressor rotor 716. Exhaust gases from turbine rotor 718 are discharged through turbine exhaust nozzle 660 producing additional thrust to the turbofan.

The turbine inlet control structure 720 is identical to that illustrated and described with respect to turbocharger 20 illustrated in FIGS. 1-16 and turbojet 500 of FIG. 24. This control structure operates to control both the velocity and angle of combustion gases directed against turbine rotor 718 from combustion liner 668. It will be understood that the monitoring structure illustrated and disclosed with respect to FIGS. 6 and 7 relating to turbocharger 20 may be directly applied to the turbojet and turbofan FIGS. 24 and 25, respectively. Thus, the speed of the turbine and associated compressors may be monitored and the turbine nozzle inlet area varied in accordance with this speed or in accordance with other engine parameters as desired.

During rotation of axial stage compressor rotor 732, armatures 742 are rotated relative to windings 744, causing the generation of electricity therefrom. This electricity may be used to operate various engine or aircraft systems as desired and provides a very economical and compact energy package for the system.

Figure 26:
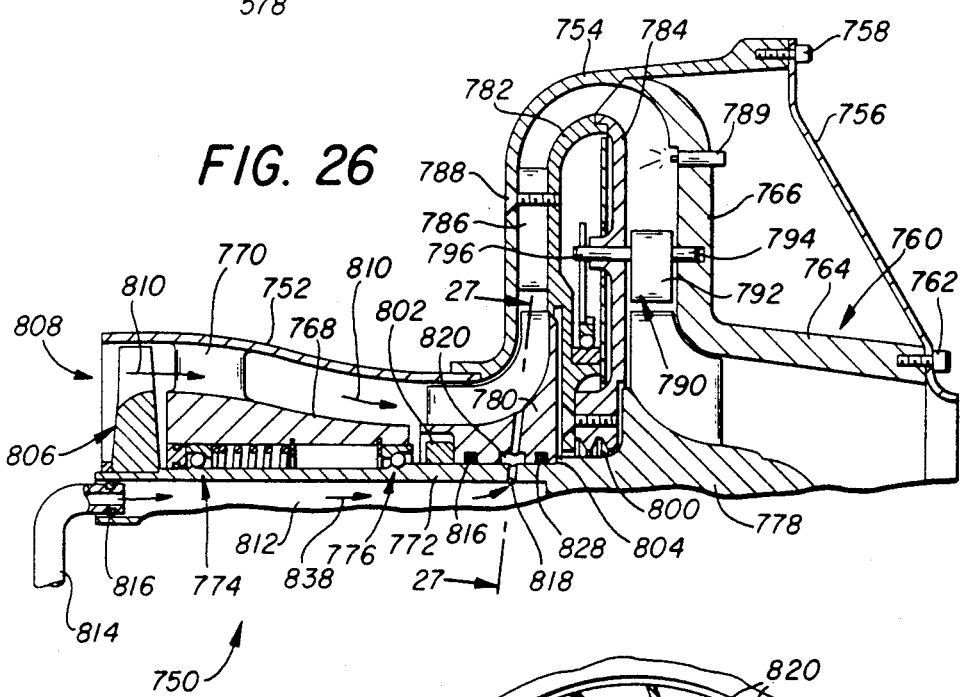
FIG. 26 illustrates a vertical section of the upper half of an alternative embodiment of the turbojet illustrated in FIG. 24.
Figure 27:
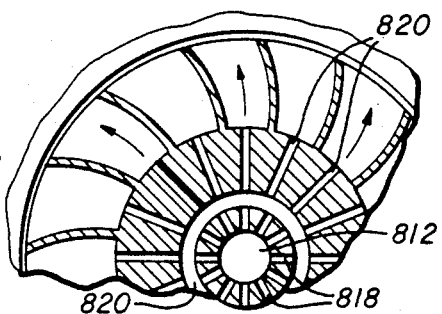
FIG. 27 is a section view taken on line 27—27 of FIG. 26.

Referring now to FIGS. 26 and 27, an alternative embodiment of the turbojet illustrated in FIG. 24 is shown and identified generally by the numeral 750. Turbojet 750 includes an inlet cylinder 752 joined to a main housing 754 with a back plate 756 attached to main housing 754 by a plurality of bolts 758. A turbine exhaust nozzle 760 is attached to the end of back plate 756 opposite main housing 754 by appropriate bolts 762. Turbine exhaust nozzle includes an exhaust cylinder 764 and a laterally extending portion 766 formed to join main housing 754.

A bearing support cylinder 768 is supported from inlet cylinder 752 by a plurality of stators 770. A shaft 772 is supported within cylinder 768 by bearing assemblies 774 and 776. Bearing assemblies 774 and 776 are identical in structure and operation to bearing assemblies 576 and 578 illustrated with respect to the embodiment of FIG. 24. A turbine rotor 778 is formed integrally with shaft 772 and a compressor rotor 780 is mounted on shaft 772 intermediate of turbine rotor 778 and bearing assemblies 774 and 776.

A compressor backwall 782 and a turbine backwall 784 are mounted within main housing 754. A plurality of stator vanes 786 are mounted between main housing 754 ignitor 789 is mounted within lateral extending portion 766 of turbine nozzle 760 into the chamber formed between that wall and turbine backwall 784.

A turbine nozzle inlet area control structure 790 including a movable vane 792 supported for rotation on trunnions 794 and 796 within transverse wall 766 and turbine backwall 784, respectively, is provided. This turbine nozzle inlet area control structure 790 is identical to that structure disclosed and illustrated in the embodiment of turbocharger 20 of FIGS. 1-16 and turbojet 500 of FIG. 24. A labyrinth seal 800 is formed within turbine backwall 784 to provide an effective seal between the turbine and compressor areas. Compressor rotor 780 is mounted on shaft 772 by nut 802 engaging rotor 780 against a step 804 in shaft 772.

An axial compressor 806 rotates with shaft 772 to cooperate with stators 770 to compress air directed into compressor inlet 808 formed by inlet cylinder 752. Compressed air is directed along a path indicated by arrow 810. In the embodiment illustrated in FIGS. 26 and 27, shaft 772 is formed with an axial bore 812 therein. A fuel supply conduit 814 is connected with bore 812 to provide a supply of fuel within the axial bore. An appropriate seal 816 is positioned between fuel supply conduit 814 and the surface of bore 812 to prevent loss of fuel at the point of connection of the conduit and the shaft.

A plurality of radial ports 818 are formed through shaft 772 to communicate between bore 812 and an annular groove 820 formed in compressor rotor 780. A plurality of radial ports 822 communicate from groove 820 through compressor rotor 780. Suitable seal means such as O-rings 826 and 828 are mounted in annular grooves within rotor 780 to prevent leakage of fuel at the point of connection between the rotor and shaft 772.

In operation of the turbojet illustrated in FIGS. 26 and 27, fuel is supplied to bore 812 of shaft 772 through fuel supply conduit 814. A fuel supply path is provided between bore 812 and the air flow path indicated by arrows 810 (FIG. 26) through ports 818, groove 820 and ports 822. This fuel flow path is indicated by arrows 838. As compressor rotor 780 is rotated, fuel is carried by centrifugal force from bore 812 through this fuel path into the air path indicated by arrows 810. Simultaneously therewith, air is drawn into inlet port 808 by axial stage compressor 806 and is delivered in a compressed state along the air path. This air is further compressed by radial compressor rotor 780 and mixed with the fuel downstream of the compressor rotor. The fuel is highly atomized as a result of the action of the compressor rotor blades on the fuel as it is ejected from the ports 822 through the compressor rotor. This atomized fuel when mixed with the compressed air delivered into the turbojet is directed along the air path and is ignited by ignitor 836 upstream of turbine rotor 778. The exhaust gases resulting from combustion move past the vanes of turbine rotor 778 to drive the rotor in a conventional manner. These exhaust gases are then discharged through nozzle 760 to provide thrust from the turbojet. It will be understood that the combustion temperature is considerably greater with this system of combustion and would require materials capable of withstanding the greater temperatures.

The system of FIGS. 25 and 26 eliminate many of the components heretofore required in conventional turbojets. The unique fuel supply system illustrated in FIGS. 25 and 26 eliminates the need for a fuel pump and all associated hardware. The conventional fuel pump is fuel in an atomized state by projecting the fuel through a bore in the compressor rotor shaft and through ports in the compressor rotor itself into the air stream compressed by the rotor. The system of FIGS. 25 and 26 further provides a two-stage compression arrangement, wherein an axial stage compressor is applied upstream of the radial or centrifugal compressor. This arrangement provides additional balance to the system by providing the axial stage compressor on the side of the bearing structures opposite that of the radial compressor.

Further, this arrangement positions the bearing structure remote from the turbine rotor and combustion chamber immediately upstream of the turbine rotor. This arrangement insulates the bearing structure from the extreme temperatures experienced in this area of the system. Therefore, no oil system is required. Moreover, the units are adaptable to very small turbojets or turbofans.

Figure 28:
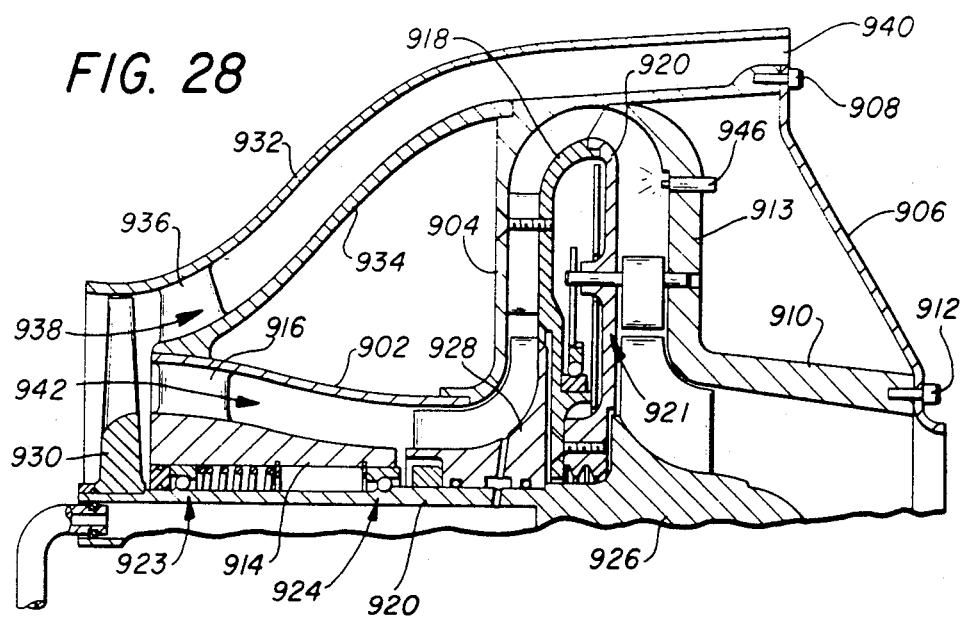
FIG. 28 illustrates a vertical section showing the upper half of a turbofan according to the present invention.

FIG. 28 shows an alternative embodiment of the turbojet illustrated in FIG. 27 to produce a turbofan 900. The structure of turbofan 900 is substantially identical to turbojet 750 illustrated in FIG. 27 with the exception that a bypass air channel is provided in addition to the primary air channel. The turbofan includes an inlet cylinder 902 joined to a main body 904 and a backwall 906 attached to main housing 904 by bolts 908. A turbine exhaust nozzle 910 is supported from backwall 906 by bolts 912 with a laterally extending portion 913 of nozzle 910 in engagement with main housing 904. A bearing support cylinder 914 is supported from inlet cylinder 902 by a plurality of struts 916. A compressor backwall 918 and turbine backwall 920 are supported within main housing 904. A turbine inlet area control structure 921 identical to that disclosed with respect to structure 790 of the turbojet of FIG. 26 is provided. A shaft 922 is supported for rotation within bearing support cylinder 914 by bearing assemblies 923 and 924. These bearing assemblies are identical to those disclosed with respect to the turbojet illustrated and described in FIG. 26. A turbine rotor 926 is mounted to one end of shaft 922 and a compressor rotor 928 is mounted intermediate of turbine rotor 926 and bearing assemblies 923 and 924.

In the embodiment illustrated in FIG. 28, an axial compressor rotor 930 is mounted to the end of shaft 922 and directs air along a primary flow path within inlet cylinder 902 and a secondary flow path formed between outer secondary flow wall 932 and inner secondary flow wall 934. Outer secondary flow wall 932 is supported from inner wall 934 by a plurality of stators 936. Air directed through the secondary flow path, indicated by arrow 938, is compressed by the action of compressor rotor 928 and stators 936 and is exhausted through exhaust nozzle 940 to produce thrust from the turbojet. Air directed along the primary flow path, indicated by arrow 942, is compressed by rotor 928 and mixed with fuel supplied into the air stream in an identical way as described with respect to the embodiment of FIG. 26 and ignited by an ignitor 946. The combustion gases are directed through turbine inlet area control structure 921 to drive turbine rotor 926 and compressor rotors 930 and 928. Air exhausted past turbine rotor 926 through turbine exhaust nozzle 910 provides further thrust from the turbofan.

Figure 29:
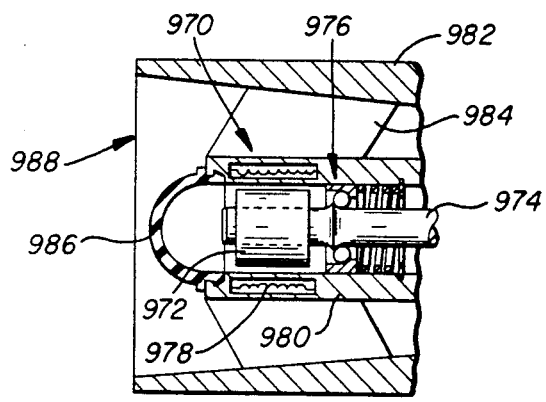
FIG. 29 is a vertical section of an electric generator adapted to the turbocharger of FIGS. 1-16 and for adaption to the turbojets and turbofan of FIGS. 24-29.

FIG. 29 illustrates a further embodiment of the systems illustrated in the prior figures wherein an electrical generator 970 is mounted within the compressor inlet nozzle. Referring now to FIG. 29, electrical generator 970 includes an armature 972 mounted on the end of compressor and turbine shaft 974. As is seen in FIG. 27, shaft 974 is supported by bearing assembly 976 and a second bearing assembly (not shown) identical to the bearing assemblies shown with respect to the turbocharger of FIGS. 1–16 and the turbojets of FIGS. 24–28. A field winding 978 is mounted within bearing support housing 980, which is in turn concentrically mounted within compressor inlet nozzle 982 by vanes 984 in the same manner discussed earlier with respect to both the turbocharger and turbojet and turbofan embodiments. A cap 986 is mounted on the end of bearing support housing 980.

In operation of the generator, the armature 972 rotates with shaft 974 within field winding 978 to produce an electrical current in the well known manner. Electric current so produced is directed by way of leads (not shown) from field winding 978 to any point in the system requiring electrical power. Thus, with respect to the present invention as used on a turbocharger, the generator may be used to supply electric current for any components in an automobile or other equipment requiring electrical power. With respect to application of the invention disclosed in FIG. 29 to the turbojets of FIGS. 24–28, electrical energy may be used for guidance systems or other components requiring electrical power.

Thus, the invention disclosed in FIG. 29 provides a very simple and straightforward electric generator driven directly by the rotation of the compressor and turbine shaft. Moreover, the location of the generator provides a very compact system, light in weight and not interfering with the operation of the system from which it derives its power.

Therefore, the present invention provides a turbojet and turbofan arrangement wherein the combustion chamber is removed from the bearing assemblies used to support the compressor and turbine shaft. In another embodiment of the invention, the present invention incorporates an axial stage compressor on the opposite side of the bearing assemblies from a radial compressor. The invention also envisions the introduction of fuel into the turbojet system by supplying fuel directly through the radial compressor rotor from the compressor rotor shaft. In this embodiment, the fuel is ejected by centrifugal force and a fuel pump and accompanying hardware is eliminated.

In the embodiment of the present invention providing for a turbofan, a bypass flow and a primary flow are provided. In accordance with one embodiment of this invention, an axial stage compressor is incorporated upstream and on opposite sides of the bearing assemblies from a radial compressor.

The present invention also envisions the incorporation of a generator including an armature mounted on the end of the compressor and turbine shaft opposite the bearing assemblies from the compressor and turbine with a field winding mounted in the bearing support structure. This arrangement provides a very simple and straightforward generator for providing electrical power to the overall system.

Although preferred embodiments of the invention have been described in the foregoing detailed description and illustrated in the accompanying drawings, it will be understood that the invention is not limited to the embodiments disclosed, but is capable of numerous rearrangements, modifications, and substitutions of parts and elements without departing from the spirit of the invention. The present invention is therefore intended to encompass such rearrangements, modifications and substitutions of parts and elements as fall within the scope of the appended claims.

I claim:
1. A turbojet comprising:
   a housing having a flow channel communicating between a compressor inlet and a turbine exhaust,
   a radical flow compressor rotor fitted within said housing for receiving and compressing air from the compressor inlet and for directing compressed air along the flow channel, a fuel means for introducing fuel with said air flow channel to form an air fuel mixture within said air flow channel, ignition means within said air flow channel downstream of said compressor rotor for igniting the air fuel mixture to produce combustion gases, a turbine rotor in driving communication with said compressor rotor and positioned in said housing downstream of said ignition means to receive combusion gases from the air flow channel for driving the turbine and discharging the air through the turbine air exhaust, a shaft supporting said compressor rotor and said turbine rotor and extending from said compressor rotor and away from said turbine rotor, bearing support means supported from said housing for rotatively supporting said shaft such that said radial flow compressor rotor and said turbine rotor are positioned to one side of said bearing support means with said bearing support means separated from said turbine by said radical flow compressor, an armature mounted on said shaft within the air flow channel and on the side of said bearing means opposite said first compressor rotor and said turbine rotor, and a field winding mounted in the housing adjacent said armature whereby electric current is produced when said armature rotates relative to said field winding.

* * * * *